United States Patent
Emami et al.

(10) Patent No.: US 10,613,209 B2
(45) Date of Patent: Apr. 7, 2020

(54) WIRELESS CONTROL OF UNMANNED AERIAL VEHICLE WITH DISTANCE RANGING AND CHANNEL SENSING

(71) Applicant: QUALCOMM INCORPORATED, San Diego, CA (US)

(72) Inventors: Sohrab Emami, Hillsboro, OR (US); Keangpo Ricky Ho, Hillsboro, OR (US); Ou Yang, Hillsboro, OR (US); Sanghoek Kim, Hillsboro, OR (US); Shi Cheng, Hillsboro, OR (US); Stephen Bennett, Hillsboro, OR (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/224,431

(22) Filed: Jul. 29, 2016

(65) Prior Publication Data
US 2017/0029107 A1     Feb. 2, 2017

Related U.S. Application Data

(63) Continuation-in-part of application No. PCT/US2016/043766, filed on Jul. 22, 2016, and a
(Continued)

(51) Int. Cl.
*H04W 40/00* (2009.01)
*G01S 13/58* (2006.01)
(Continued)

(52) U.S. Cl.
CPC .......... *G01S 13/582* (2013.01); *B64C 39/024* (2013.01); *G01S 13/003* (2013.01);
(Continued)

(58) Field of Classification Search
None
See application file for complete search history.

(56) References Cited

U.S. PATENT DOCUMENTS 7,369,879 B1    5/2008   Steigerwald et al.
9,100,074 B1    8/2015   Zhang et al.
(Continued)

FOREIGN PATENT DOCUMENTS

JP           H04147079 A     5/1992
WO     WO-2012156570 A1    11/2012
(Continued)

OTHER PUBLICATIONS

ISA/EP, International Search Report and Written Opinion of the International Searching Authority, Int'l Application No. PCT/US2016/043766, dated Oct. 21, 2016, Korean Intellectual Property Office, Republic of Korea, 10 pgs.
(Continued)

*Primary Examiner* — Jonathan M Dager
(74) *Attorney, Agent, or Firm* — Linda G. Gunderson; Holland & Hart LLP

(57) ABSTRACT

Various techniques are provided to efficiently detect the position and angular velocity of an unmanned aerial vehicle (UAV) of a UAV system including a transmitter antenna array and a receiver antenna array. In one example, a method includes establishing a wireless link between a UAV controller and a UAV using at least one transmitter antenna array and/or at least one receiver antenna array, communicating link state data corresponding to the established wireless link over the established wireless link, generating UAV operational data based, at least in part, on the link state data, wherein the UAV operational data is configured to control operation of the UAV, and controlling operation of the UAV using the UAV operational data.

27 Claims, 14 Drawing Sheets

Related U.S. Application Data continuation-in-part of application No. PCT/US2016/043765, filed on Jul. 22, 2016.

(60) Provisional application No. 62/198,326, filed on Jul. 29, 2015.

(51) Int. Cl.

| | | |
|---|---|---|
| *B64C 39/02* | (2006.01) | |
| *H04W 4/02* | (2018.01) | |
| *G08G 5/00* | (2006.01) | |
| *G05D 1/00* | (2006.01) | |
| *G01S 13/82* | (2006.01) | |
| *G01S 13/88* | (2006.01) | |
| *G01S 13/42* | (2006.01) | |
| *G01S 13/00* | (2006.01) | |
| G01S 13/02 | (2006.01) | |
| H04B 7/04 | (2017.01) | |
| B64D 47/08 | (2006.01) | |
| G05D 1/10 | (2006.01) | |
| H04L 29/08 | (2006.01) | |

(52) U.S. Cl.
CPC ............ *G01S 13/42* (2013.01); *G01S 13/825* (2013.01); *G01S 13/88* (2013.01); *G05D 1/0022* (2013.01); *G05D 1/0033* (2013.01); *G08G 5/0013* (2013.01); *G08G 5/0026* (2013.01); *G08G 5/0069* (2013.01); *G08G 5/0078* (2013.01); *G08G 5/0082* (2013.01); *H04W 4/023* (2013.01); *B64C 2201/146* (2013.01); *B64D 47/08* (2013.01); *G01S 2013/0254* (2013.01); *G05D 1/102* (2013.01); *H04B 7/04* (2013.01); *H04L 67/12* (2013.01)

(56) References Cited

U.S. PATENT DOCUMENTS

| | | | | |
|---|---|---|---|---|
| 9,871,574 | B2* | 1/2018 | Chen | H04B 7/0617 |
| 9,944,391 | B2* | 4/2018 | Spengler | B64C 39/024 |
| 2005/0156780 | A1 | 7/2005 | Bonthron et al. | |
| 2005/0270229 | A1 | 12/2005 | Stephens et al. | |
| 2006/0094449 | A1* | 5/2006 | Goldberg | H04W 16/28 |
| | | | | 455/456.6 |
| 2006/0114157 | A1 | 6/2006 | Kolanek et al. | |
| 2007/0298742 | A1 | 12/2007 | Ketchum et al. | |
| 2008/0084350 | A1* | 4/2008 | Uno | H04W 16/28 |
| | | | | 342/367 |
| 2008/0254752 | A1 | 10/2008 | Oh et al. | |
| 2009/0224960 | A1 | 9/2009 | Ishii et al. | |
| 2009/0309784 | A1 | 12/2009 | Natsume | |
| 2010/0054200 | A1 | 3/2010 | Tsai | |
| 2010/0321234 | A1* | 12/2010 | Goldman | G01S 13/9029 |
| | | | | 342/25 A |
| 2011/0065448 | A1 | 3/2011 | Song et al. | |
| 2011/0105032 | A1 | 5/2011 | Maruhashi et al. | |
| 2011/0235533 | A1 | 9/2011 | Breit et al. | |
| 2013/0182666 | A1 | 7/2013 | Sutskover et al. | |
| 2014/0022116 | A1 | 1/2014 | Lee et al. | |
| 2014/0334566 | A1 | 11/2014 | Kim et al. | |
| 2015/0015448 | A1 | 1/2015 | Almog et al. | |
| 2015/0030094 | A1 | 1/2015 | Zhang | |
| 2016/0087695 | A1* | 3/2016 | Wang | H04B 7/0695 |
| | | | | 375/267 |
| 2016/0233178 | A1 | 8/2016 | Lamy et al. | |
| 2016/0277094 | A1* | 9/2016 | Ying | H04B 7/0456 |
| 2017/0029107 | A1 | 2/2017 | Emami et al. | |
| 2017/0033468 | A1 | 2/2017 | Wong | |
| 2017/0041895 | A1* | 2/2017 | Gan | H04W 56/0035 |
| 2017/0059688 | A1* | 3/2017 | Gan | G01S 3/325 |
| 2017/0141830 | A1 | 5/2017 | Cheng et al. | |
| 2017/0142605 | A1 | 5/2017 | Cheng et al. | |
| 2017/0222315 | A1 | 8/2017 | Hozouri | |
| 2018/0025651 | A1* | 1/2018 | Anderson | B64C 39/024 |
| | | | | 701/2 |
| 2018/0136645 | A1* | 5/2018 | Hong | H04W 72/0453 |
| 2018/0157255 | A1* | 6/2018 | Halverson | B64C 39/024 |
| 2018/0210075 | A1* | 7/2018 | Kim | B64C 39/024 |
| 2019/0120954 | A1 | 4/2019 | Kim et al. | |
| 2019/0230671 | A1* | 7/2019 | Kim | H04B 7/18506 |

FOREIGN PATENT DOCUMENTS

| | | |
|---|---|---|
| WO | WO-2013085468 A1 | 6/2013 |
| WO | WO-2014074894 A1 | 5/2014 |

OTHER PUBLICATIONS

ISA/EP, International Search Report and Written Opinion of the International Searching Authority, Int'l Application No. PCT/US2016/043765, dated Oct. 21, 2016, Korean Intellectual Property Office, Republic of Korea, 12 pgs.

Nanzer J.A., et al., "A 29.5 GHz Radar Interferometer for Measuring the Angular Velocity of Moving Objects", IEEE—MTTS International Microwave Symposium. Digest, IEEE, US, Jun. 2, 2013, XP032545821, ISSN: 0149-645X, DOI: 10.1109/MWSYM.2013.6697333 [retrieved on Dec. 27, 2013], pp. 1-3.

Supplementary European Search Report—EP16831171—Search Authority—Munich—dated Feb. 20, 2019.

* cited by examiner

WIRELESS CONTROL OF UNMANNED AERIAL VEHICLE WITH DISTANCE RANGING AND CHANNEL SENSING

CROSS-REFERENCE TO RELATED APPLICATIONS

This patent application claims the benefit of and priority to U.S. Provisional Patent Application No. 62/198,326 filed Jul. 29, 2015 and entitled "WIRELESS CONTROL OF DRONE WITH DISTANCE RANGING AND CHANNEL SENSING," which is hereby incorporated by reference in its entirety.

This patent application is also a continuation-in-part of International Patent Application No. PCT/US2016/043766 filed Jul. 22, 2016 and entitled "ANGULAR VELOCITY SENSING USING ARRAYS OF ANTENNAS," which claims the benefit of and priority to U.S. Provisional Patent Application No. 62/198,326 filed Jul. 29, 2015 and entitled "WIRELESS CONTROL OF DRONE WITH DISTANCE RANGING AND CHANNEL SENSING," which are hereby incorporated by reference in their entirety.

This patent application is also a continuation-in-part of International Patent Application No. PCT/US2016/043765 filed Jul. 22, 2016 and entitled "ANGLE AND POSITION SENSING USING ARRAYS OF ANTENNAS," which claims the benefit of and priority to U.S. Provisional Patent Application No. 62/198,326 filed Jul. 29, 2015 and entitled "WIRELESS CONTROL OF DRONE WITH DISTANCE RANGING AND CHANNEL SENSING," which are hereby incorporated by reference in their entirety.

TECHNICAL FIELD

The present invention relates generally to position sensing through channel sensing and, more particularly, to methods for wireless control and position sensing of unmanned aerial vehicles (UAVs) using an array of antennas.

BACKGROUND

Radar systems have traditionally been used to detect relatively large objects up to hundreds of miles away from a high power transmitting radar antenna. Contemporary systems are commonly used to detect relatively dense objects or object surfaces that are multiple square feet in surface profile, such as potential collision surfaces relative to a vehicle (e.g., road surfaces, walls, vehicle panels, and/or other potential collision surfaces). While traditional radar systems have used (and still commonly use) rotating or actuated antennas in order to scan the radar over a large solid angle or to track objects/surfaces, more contemporary systems can employ arrays of antennas in order to scan solid angles without requiring physical motion of the array and/or to provide a more directional high gain transmit or receive beam than typically possible with a single antenna element.

However, contemporary radar systems are still generally too bulky, inefficient, and insensitive to be able to detect the position of objects and/or surfaces on the scale of a human finger reliably, or to differentiate between the positions and profiles of multiple fingers on a single human hand, a stylus and a human finger, and/or other common user interface mechanisms, or to be implemented in a form compact and efficient enough to be wearable or implemented as a user interface for a portable user device, such as a smart phone. Thus, there is a need in the art for systems and methods to provide efficient, reliable, and accurate sensing of positions of objects, particularly in the context of radar systems employing an array of antennas.

In addition, unmanned aerial vehicles (UAVs), sometimes referred to colloquially as drones, are a popular technology that can be used for various commercial applications including traffic monitoring, news reporting, fire monitoring for firefighting, survey of construction sites, package delivery, land surveillance, and others. In most contemporary applications, the UAV needs to have robust communication with its controller, mostly to provide visual information of the UAV's environment back to its controller. The UAV controller also needs to communicate commands to the UAV. Typically, the communications are facilitated by a bidirectional wireless link between the UAV and its controller that solely supports communication of information or data. Conventional consumer UAVs would benefit from radar-like capabilities, but conventional radar systems are typically heavy, require high data bandwidths, and/or are power hungry, and so conventional UAV systems, particularly consumer UAVs, operate without radar. Thus, there is a need in the art for systems and methods to provide efficient, reliable, and accurate sensing of positions of UAVs, particularly in the context of communication systems employing an array of antennas.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

In accordance with embodiments set forth herein, techniques are provided to use a compact radar antenna array to detect the position (angle and/or range) of relatively small objects and surfaces relative to the antenna array. Embodiments of such an object sensing system are able to reliably detect and differentiate objects and/or surfaces less than 0.5 cm in size and/or to a resolution approaching 1-2 mm, at a range up to 1-2 meters or more. Furthermore, the systems and methods described herein that are used to perform the detections are efficient enough to be implemented in a wearable device, such as a smart watch, without significantly impacting battery life. For example, embodiments of the present disclosure may be configured to operate with approximate power draws equal to or less than 250 mW, 100 mW, 80 mW, and/or lower power draws, depending on a desired sensitivity, range, duty cycle and/or other operational characteristics.

In various embodiments, a phased array antenna may be used to implement the transmitter array and/or the receiver array in a radar system to facilitate measurement of the angle of departure (AoD) and/or the angle of arrival (AoA) to an object or surface broadside to the antenna array, as described more fully herein. For example, both AoD and AoA can be derived from measurements of a phase relationship of a departure or arrival wave among different antennas of the radar.

Figure 1:
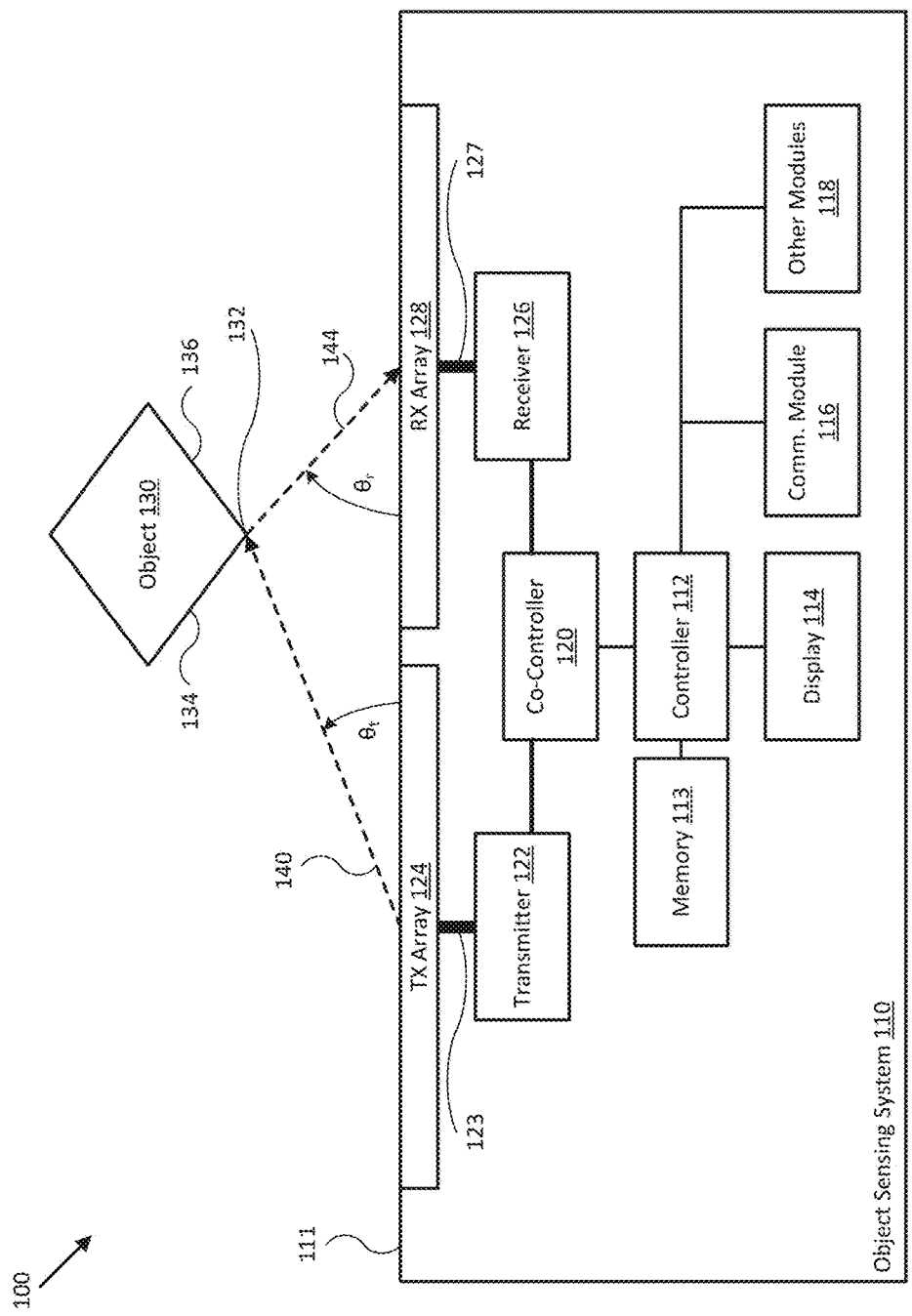
FIG. 1 illustrates a block diagram of an object sensing system in accordance with an embodiment of the disclosure.
Figure 2A:
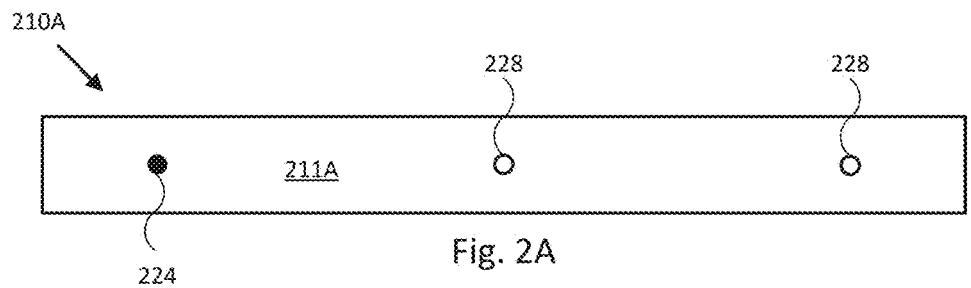
FIGS. 2A-E illustrate various transmitter and receiver antenna array arrangements in accordance with an embodiment of the disclosure.
Figure 2B:
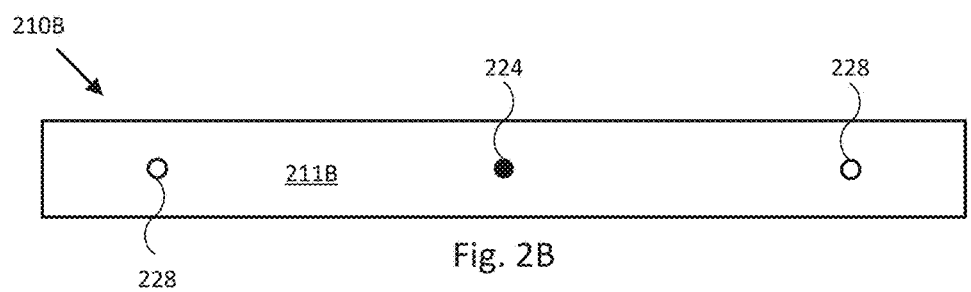
Figure 2C:
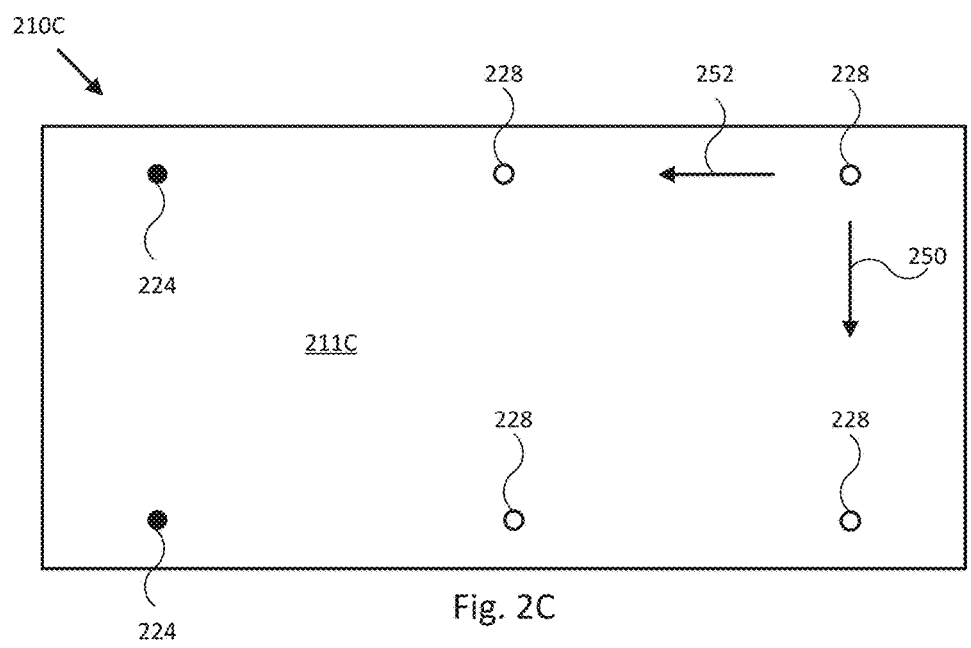
Figure 2D:
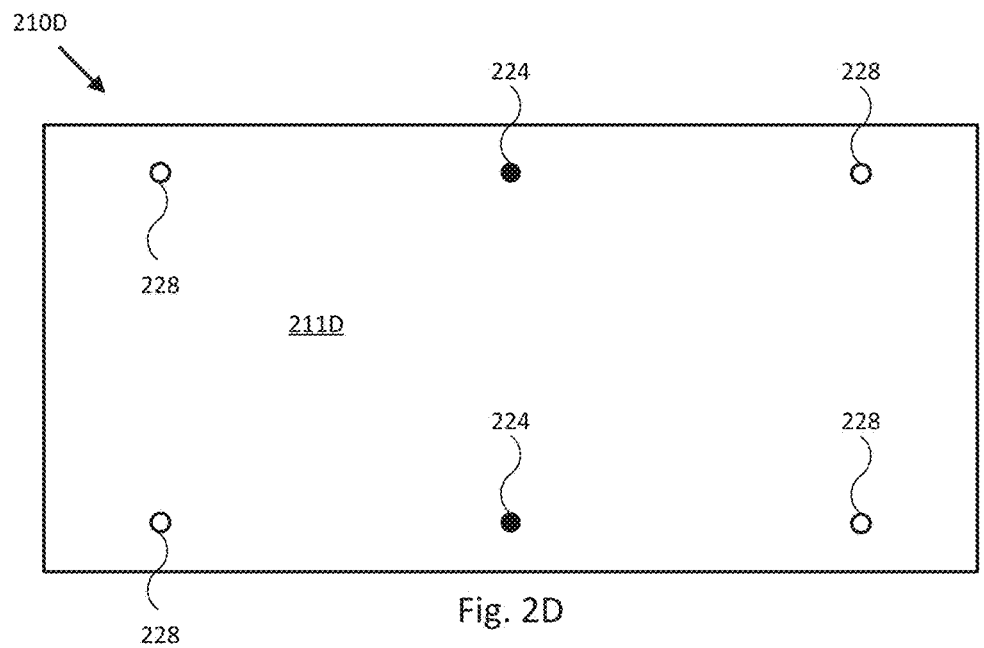
Figure 2E:
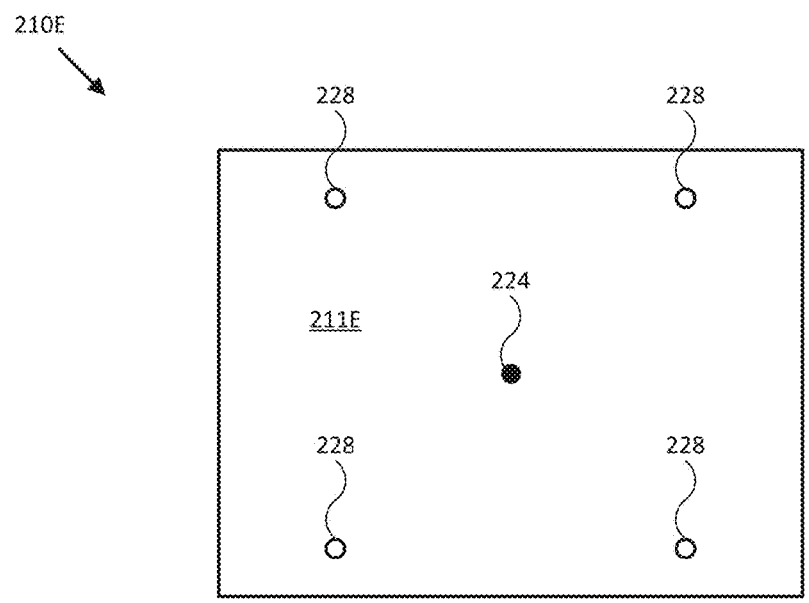

Referring now to the drawings, FIG. 1 illustrates a block diagram 100 of an object sensing system 110 in accordance with an embodiment of the disclosure. In various embodiments, system 110 may be implemented as compact, portable, and/or wearable device configured to detect a position (e.g., angle and/or range) of an object 130 relative to system 110. More generally, system 110 may be implemented as any device or system including a transmitter antenna array 124 and a receiver antenna array 128 configured to detect the position of object 130 using the methods described herein.

As shown in the embodiment illustrated in FIG. 1, system 110 includes controller 112 and co-controller 120. Controller 112 and/or co-controller 120 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of co-controller 120, transmitter 122, receiver 126, and/or other modules of system 110, for example. Such software instructions may also implement methods for processing sensor signals, determining sensor information, providing user feedback (e.g., through display 114), querying devices for operational parameters, selecting operational parameters for devices, or performing any of the various methods described herein.

For example, controller 112 and/or co-controller 120 may be configured to designate a plurality of transmitter and receiver channels for transmitter antenna array 124 and receiver antenna array 128 of object sensing system 110, scan transmitter antenna array 124 and receiver antenna array 128 through the designated channels to measure channel responses corresponding to each one of the designated channels, and determine directional vectors 140 and/or 144 to/from a nearest point 132 of object 130 based, at least in part, on the measured channel responses. In some embodiments controller 112 and/or co-controller 120 may be configured to determine multiple directional vectors corresponding to surfaces 134 and/or 136 of object 130, for example, in addition to or as an alternative to determining directional vectors 140 and/or 144 to/from nearest point 132 of object 130.

In some embodiments, directional vectors 140 and/or 144 may be defined by their corresponding angle of departure (AoD) $\theta_t$ or angle of arrival (AoA) $\theta_r$, as shown in FIG. 1. AoD may be defined variously as the angle between emission surface 111 and directional vector 140 to object 130, as the complement of the angle between the array normal vector (e.g., the normal to surface 111) and directional vector 140 between an antenna element of transmitter antenna array 124 and object 130, or as the angle between the broadside direction of transmitter antenna array 124 and object 130. AoA may be defined variously as the angle between emission surface 111 and directional vector 144 from object 130, as the complement of the angle between the array normal vector and directional vector 144 between object 130 and an antenna element of receiver antenna array 128, or as the angle between the broadside direction of receiver antenna array 128 and object 130. Once directional vectors 140 and/or 144 or AoD $\theta_t$ and/or AoA $\theta_r$ are determined, controller 112 may be configured to use display 114 to indicate detection of object 130 or a relative position of object 130, for example, or to provide a radar image of object 130. In other embodiments, controller 112 may be configured to use the determined directional vectors 140 and/or 144 or AoD $\theta_t$ and/or AoA $\theta_r$ to implement different methods for determining updated positions for object 130, for example, or for determining an angular speed of object 130, as described herein.

In various embodiments, a machine readable medium, such as memory 113, may be provided for storing non-transitory instructions for loading into and execution by controller 112 or co-controller 120. In these and other embodiments, controller 112 and/or co-controller 120 may be implemented with other components where appropriate, such as volatile memory, non-volatile memory, one or more interfaces, and/or various analog and/or digital components for interfacing with various modules of system 110. For example, controller 112 may be adapted to store sensor signals, sensor information, parameters for coordinate frame transformations, calibration parameters, sets of calibration points, and/or other operational parameters, over time, for example, and provide such stored data to a user using display 114.

In typical embodiments, controller 112 may be tasked with overseeing general operation of system 110, generating imagery from radar data, correlating radar data/imagery, communicating operational parameters and/or sensor information with other devices through communication module 116, and/or other non-time-critical operations of system 110. In such embodiments, co-controller 120 may be implemented with relatively high resolution timing circuitry capable of generating digital transmission and/or sampling control signals (e.g., amplitude weight vectors) for operating transmitter 122, receiver 126, and/or other devices of system 110, for example, and other time critical operations of system 110, as described herein. In some embodiments, controller 112 and co-controller 120 may be integrated together, for example, or may be implemented in a distributed manner across a number of individual controllers.

Transmitter 122 may be implemented with one or more digital to analog converters (DACs), signal shaping circuits, filters, phase adjusters, signal conditioning elements, amplifiers, attenuators, timing circuitry, logic devices, and/or other digital and/or analog electronics configured to accept digital control signals from co-controller 120 and to provide analog transmission signals over analog interface 123 to excite one or more antenna elements of transmitter antenna array 124 and produce one or more transmission beams or channels, as described herein. In various embodiments, overall operation of transmitter 122 (e.g., amplification, attenuation, phase shifting, AWV application, and/or other per-element signal adjustments) may be controlled (e.g., through use of the various control signals) by co-controller 120.

Receiver 126 may be implemented with one or more analog to digital converters (ADCs), filters, phase adjusters, signal conditioning elements, amplifiers, attenuators, timing circuitry, logic devices, and/or other digital and/or analog electronics configured to receive analog signals over analog interface 127 corresponding to one or more antenna elements of receiver antenna array 128, convert the analog signals into digital signals, and provide the digital signals to co-controller 120 for processing and/or storage, as described herein. In various embodiments, operation of receiver 126 (e.g., amplification, attenuation, basebanding, sampling, timing/triggering, AWV application, and/or other per-element signal adjustments) may be controlled by co-controller 120. In some embodiments, receiver 126 may be configured to low-pass or otherwise filter, amplify, decimate, and/or otherwise process the analog and/or digital signals (e.g., using analog and/or digital signal processing) prior to providing the digital signals to co-controller 120. In other embodiments, receiver 126 may be configured to provide substantially unprocessed (e.g., raw) analog and/or digital signals to co-controller 120 for further signal processing, as described herein. In some embodiments, transmitter 122 and receiver 126 may be integrated into a single transceiver.

Display 114 may be implemented as a digital display, a touch screen, and/or other display device that can be configured to display radar data, images, text, icons, indicators, and/or other graphics as controlled by controller 120. Communication module 116 may be implemented as one or more analog or digital devices or interfaces configured to support wired or wireless communications to other devices, including other object sensing systems similar to object sensing system 110. In such embodiments, system 110 may be configured to broadcast detection characteristics and/or data corresponding to object 130, for example, or to collaboratively detect a position or motion of object 130. In one embodiment, communication module 116 may be configured to co-opt any combination of co-controller 120, transmitter 122, transmitter antenna array 124, receiver 126, and/or receiver antenna array 128 to communicate wirelessly with other devices and/or systems.

Other modules 118 may include one or more additional interfaces, feedback devices, support electronics, and/or environmental sensors, such as a physical user interface device (e.g., a joystick, rotating selector, button), indicator, battery or power supply/charging circuit, strap or lanyard, wired or wireless communications interface, external memory slot or interface, speaker, microphone, fingerprint sensor, pulse monitor, digital light/image projector (e.g., configured to overlap with an available detection area of transmitter antenna array 124 and receiver antenna array 128), accelerometer/gyroscope, global navigation satellite system (GNSS) receiver, and/or other electronic modules or devices commonly found in a portable electronic device or smart phone/watch.

Transmitter antenna array 124 and receiver antenna array 128 may each be implemented as any linear antenna array arrangement or any two or multidimensional antenna array arrangement that can be energized by transmitter 122 and receiver 126, respectively, to form various different channels between transmitter antenna array 124 and receiver antenna array 128, as described herein. More specifically, transmitter antenna array 124 may be configured to receive transmission signals over analog interface 123 (e.g., traces and/or waveguides) and generate a corresponding transmitter beam or channel using one or a combination of antenna elements of transmitter antenna array 124. Similarly, receiver antenna array 128 may be configured to receive transmission signals over analog interface 127 (e.g., traces and/or waveguides) and generate a corresponding receiver beam or channel using one or a combination of antenna elements of receiver antenna array 128.

In various embodiments, transmitter antenna array 124 and receiver antenna array 128 may be implemented as printed or microstrip antenna arrays arranged on a relatively flat substrate and be configured to operate most efficiently in the GHz bands, and more specifically between 50 GHz and 70 GHz, or approximately within the 60 GHz band. Each array may include one or multiple antenna elements, and each group of antenna elements may be formed according to a variety of patterns, such as rectangular, square, centered square, and/or other patterns, which may be selected to facilitate a particular radiation pattern, available detection area, and/or other operational feature of the individual antenna arrays and/or object sensing system 110. In some embodiments, the antenna elements in each array may be spaced uniformly relative to their nearest adjacent antenna elements, for example, and the separation can be dictated by the expected operating frequency. For example, for 60 GHz millimeter-wave applications, an antenna separation d may be approximately 2.5 mm.

FIGS. 2A-E illustrate various transmitter and receiver antenna array arrangements in accordance with an embodiment of the disclosure. For example, object detection system 210A in FIG. 2A includes a single element transmitter antenna array (e.g., transmitter antenna element 224) and a two element receiver antenna array (e.g., receiver antenna elements 228) disposed laterally from the single element transmitter antenna array such that the transmitter and receiver arrays are arranged in a linear antenna array on surface 211A of system 210A. Object detection system 210B in FIG. 2B includes a single element transmitter antenna array (e.g., transmitter antenna element 224) disposed between a two element receiver antenna array (e.g., receiver antenna elements 228) such that the transmitter and receiver arrays are arranged in a linear antenna array on surface 2118 of system 210B. Object detection system 210C in FIG. 2C includes a two element transmitter antenna array (e.g., transmitter antenna elements 224 in a linear array) and a four element receiver antenna array (e.g., receiver antenna elements 228 in a square array) such that the transmitter and receiver arrays are arranged in a two dimensional rectangular antenna array on surface 211C of system 210C and having first and second major axes 250 and 252. Object detection system 210D in FIG. 2D includes a two element transmitter antenna array (e.g., transmitter antenna elements 224 in a linear array) disposed within a four element receiver antenna array (e.g., receiver antenna elements 228 in a rectangular array) such that the transmitter and receiver arrays are arranged in a two dimensional rectangular antenna array on surface 211D of system 210D. Object detection system 210E in FIG. 2E includes a single element transmitter antenna array (e.g., transmitter antenna element 224) disposed within and/or equidistant from a four element receiver antenna array (e.g., receiver antenna elements 228 in a square array) such that the transmitter and receiver arrays are arranged in a two dimensional centered square antenna array on surface 211E of system 210E.

In various embodiments, the spacing between antenna elements 224/228 in each system described in FIGS. 2A-E may be uniform for all elements, may be uniform for each type of element (e.g., transmitter or receiver), or may be staggered or patterned to facilitate a particular directionality, radiation pattern, or bandwidth/frequency response, for example, or may be selected to facilitate other operating characteristics of an object detection system, as described herein. In some embodiments, other antenna arrangements than those illustrated in FIGS. 2A-E may be used, such as antenna arrangements including additional antenna elements and/or multiple surfaces 211A-E, for example, and/or antenna arrangements disposed on three dimensional surfaces (e.g., where surfaces 211A-E are three dimensional and include a depth profile or contour in or out of the pages depicting FIGS. 2A-E).

Portions of the following description detail various methods to detect the position of an object relative to a linear antenna array in order to simplify the explanation and present the methods clearly; however, it should be understood that the described techniques, methods, and signal processing extend naturally to systems implemented with two-dimensional or three-dimensional antenna arrays. Moreover, the disclosed methods may be used to detect positions of objects using arbitrarily sized and/or spatially arranged antenna arrays, including all the antenna array arrangements disclosed herein.

Radar Channel Measurements

In various embodiments, both AoA and AoD may be derived from channel measurements using the methods described herein. Such channel measurements may be based on any invertible matrix (e.g., a channel matrix) representing multiple complex Amplitude Weight Vectors (AWVs) applied to the transmit and receive antenna arrays, such as those illustrated in FIGS. 2A-E. For example, the AWVs may represent the phase shifts of the signals provided to each antenna element in the transmit and receive antenna arrays. In some embodiments, such channel matrix can be selected to be an orthogonal matrix.

For example, if transmitter antenna array 124 has N antenna elements arranged in a linear array and receiver antenna array 128 has M antenna elements arranged in a linear array, the channels between transmitter antenna array 124 and receiver antenna array 128 may be characterized by an N×M channel matrix H. To measure H, in principle, antenna elements from transmitter antenna array 124 and receiver antenna array 128 can be turned on (e.g., energized with a signal) in pairs, one by one, to obtain respective entries for channel matrix H. In general, each entry in channel matrix X may be a complex number representing at least a portion of a transfer function associated with a selected pair of antenna elements. This exhaustive pair method works well but typically suffers from a relatively low signal-to-noise ratio (SNR).

In some embodiments, Hadamard matrix techniques can be used to improve the SNR when determining channel matrix H. For example, using square Hadamard matrices, measurement of each channel in channel matrix H may be performed by turning on all the transmit antenna according to an AWV corresponding to an n-th row of the N×N Hadamard matrix $M_{TX}$ and turning on all the receive antenna according to an AWV corresponding to an m-th column of the M×M Hadamard matrix $M_{RX}$. Where multiple equivalent or inequivalent Hadamard matrices exist for a particular order matrix, the specific Hadamard matrices used for $M_{TX}$ and/or $M_{RX}$ may be preselected based on a desired channel order, for example, selected to minimize turn on/off temporal or spatial noise in the respective antenna arrays during typical operation, among other operational characteristics, for instance. When the row or column of the Hadamard matrix is applied to the phase shifters (or AWVs) for each antenna array, instead of obtaining channel matrix H, the N×M measurement matrix A is obtained instead (e.g., with complex number entries each representing at least a portion of a transfer function associated with a selected pair of Hadamard transmitter and receiver channels determined by $M_{TX}$ and/or $M_{RX}$), where:

$$A = M_{TX} H M_{RX}. \quad (1)$$

By multiplying the measurement matrix A by the transpose of Hadamard matrices $M_{TX}$ and $M_{RX}$, the following relation is obtained:

$$M_{TX}{}^H A M_{RX}{}^H = NMH, \quad (2)$$

where $^H$ denotes the Hermitian transpose. Although the Hermitian transpose of a Hadamard matrix is the same as its transpose, the Hermitian transpose is used here as a notation for a more general case described herein. In (2), because the Hadamard matrix is composed by orthogonal vectors, $M_{TX}{}^H M_{TX} = NI_N$ and $M_{RX}{}^H M_{RX} = MI_M$.

Advantageously, the Hadamard matrix is used to differentiate channel measurements when determining the channel matrix because all of its entries are either +1 or −1, which simplifies multiplication, increases the overall SNR, and allows a phase-only AWV to be used. In some embodiments, complex Hadamard matrices may be used, such as the discrete Fourier transform (DFT) matrix. In certain specific embodiments, complex Hadamard matrices may be selected to have entries including +1, −1, +j, and −j, in order to simplify the design of the phase shifter/AWV implementation device.

Channel Matrix Formulation

In various embodiments, once the channel matrix H is determined through measurement, singular-value decomposition (SVD) may be used to find AoA and AoD to an object or portion of an object. In general terms, SVD is a procedural method that can be configured to probe the spatial distribution of energy in a measured signal through selection of the form of the orthonormal bases into which the measured signal is decomposed. For example, for a far-away object an angle of $\theta_t$ from transmitter antenna array 124 and an angle $\theta_r$ from receiver antenna array 128, both the transmitted wave 140 to the object and the received wave 144 from the object may be idealized as plane waves. Assuming that elements of both transmitter antenna array 124 and receiver antenna array 128 have an antenna separation/spacing of d (e.g., closest distance), d may be selected to be half the wavelength of the desired excitation signal to be used to energize transmitter antenna array 124. More generally, d may be any antenna separation or distribution of separations selected to facilitate operation of system 110. For 60 GHz millimeter-wave applications, the antenna separation d may be typically approximately 2.5 mm, for example.

Taking into account the different gain for each transmitter and receiver antenna element, the response of the transmitter and receiver arrays to a detected object may be represented by the directional vectors a and b, respectively. Typically, both directional vectors a and b may include complex number entries in order to represent the different phase shifts of the antenna gains or the slightly different path lengths to the object. Using this representation, aside from a constant phase and amplitude, the channel matrix H may take the analytical form:

$$H = [\,a_1 \quad a_2 e^{j2\pi d/\lambda \sin\theta_t} \quad a_3 e^{j4\pi d/\lambda \sin\theta_t} \quad \ldots\,]^H \quad (3)$$

-continued $$[b_1 \quad b_2 e^{-j2\pi d/\lambda \sin\theta_r} \quad b_3 e^{-j4\pi d/\lambda \sin\theta_r} \quad ...]$$

In the general case, where multiple detected objects are represented by the transmitter directional vectors $$t_k = [a_{k,1} \quad a_{k,2} e^{j2\pi d/\lambda \sin\theta_{t,k}} \quad a_{k,3} e^{j4\pi d/\lambda \sin\theta_{t,k}} \quad ...]$$

and receiver directional vectors $$r_k = [b_{k,1} \quad b_{k,2} e^{-j2\pi d/\lambda \sin\theta_{r,k}} \quad b_{k,3} e^{-j4\pi d/\lambda \sin\theta_{r,k}} \quad ...],$$

the overall channel matrix is:

$$H = \Sigma_k \sigma_k t_k^H r_k \quad (4)$$

where $\sigma_k$ is a complex number representing the amplitude and phase of a respective specific path to a detected object. Typically, a phase of $\sigma_k$ may be absorbed into a constant phase of either $t_k$ or $r_k$, giving a positive $\sigma_k$ for the channel amplitude gain.

If the number of objects is small or where a single object dominates (e.g., is large relatively to other objects from which transmit waves are reflected), after SVD of (4), a dominant path to the object corresponds to the path having the largest singular value. The other paths may be considered as noise that have contaminated the dominant path. By extension, if the system is configured to resolve K objects, paths corresponding to the first K largest singular values of (4) may be selected as the paths to the K objects. Moreover, if the system is configured to resolve K differentiated or spaced objects, paths corresponding to the first K largest singular values of (4) separated by smaller singular values (e.g., corresponding to saddle points or gaps between objects) of (4) may be selected as the paths to the K differentiated objects.

In some embodiments, AoA and AoD may be determined by obtaining the channel matrix H from a relation (2) to a measurement matrix A (based on Hadamard matrices or similar orthogonal matrices to designate the channels); performing SVD to decompose the channel matrix H into dominant path(s) to provide transmitter and receiver directional vectors $t_k$ and $r_k$; and deriving the AoD(s) and/or AoA(s) from directional vectors $t_k$ and $r_k$, such as through geometric/trigonometric analysis to convert directional vectors $t_k$ and $r_k$ (e.g., analogous to transmitted wave/directional vector 140 and received wave/directional vector 144 in FIG. 1), as described herein. As noted above, by using Hadamard matrices to designate the channels and produce measurement matrix A, embodiments significantly increase the SNR of the channel measurements and the reliability of the resulting AoD(s) and/or AoA(s). Moreover by using SVD to determine the dominate path(s) to detected objects, rather than the full response profile, embodiments are able to detect angles/paths to objects relatively efficiently, both in terms of computational time and power usage. In alternative embodiments, transmitter and receiver directional vectors $t_k$ and $r_k$ may be found directly without performing SVD of (4) and/or without obtaining a complete channel matrix H, as described more fully herein.

Direct Beam Combining

As noted herein with respect to relation (2), utilization of Hadamard matrices to designate measurement channels improves the SNR when determining channel matrix H by a factor of NM. However, channel matrix H is not always necessary to find AoA or AoD because the fundamental information required is also contained within the relevant directional vectors. In a trivial example with very low efficiency, AoA can be derived by scanning the transmitter and receiver antenna beams to different angles (e.g., using appropriate phase shifts/AWVs along antenna elements in the respective arrays). In such embodiments, the AoA may correspond to a peak in signal level as a function of the angle scanning. The determination of a complete channel matrix H can require a total of N*M measurements, with the resulting angular accuracy increasing with an increasing SNR. The angular scan method typically requires far more measurements (e.g., greater than N*M) to perform an exhaustive angle search and obtain similar angular accuracy/resolution.

Figure 3:
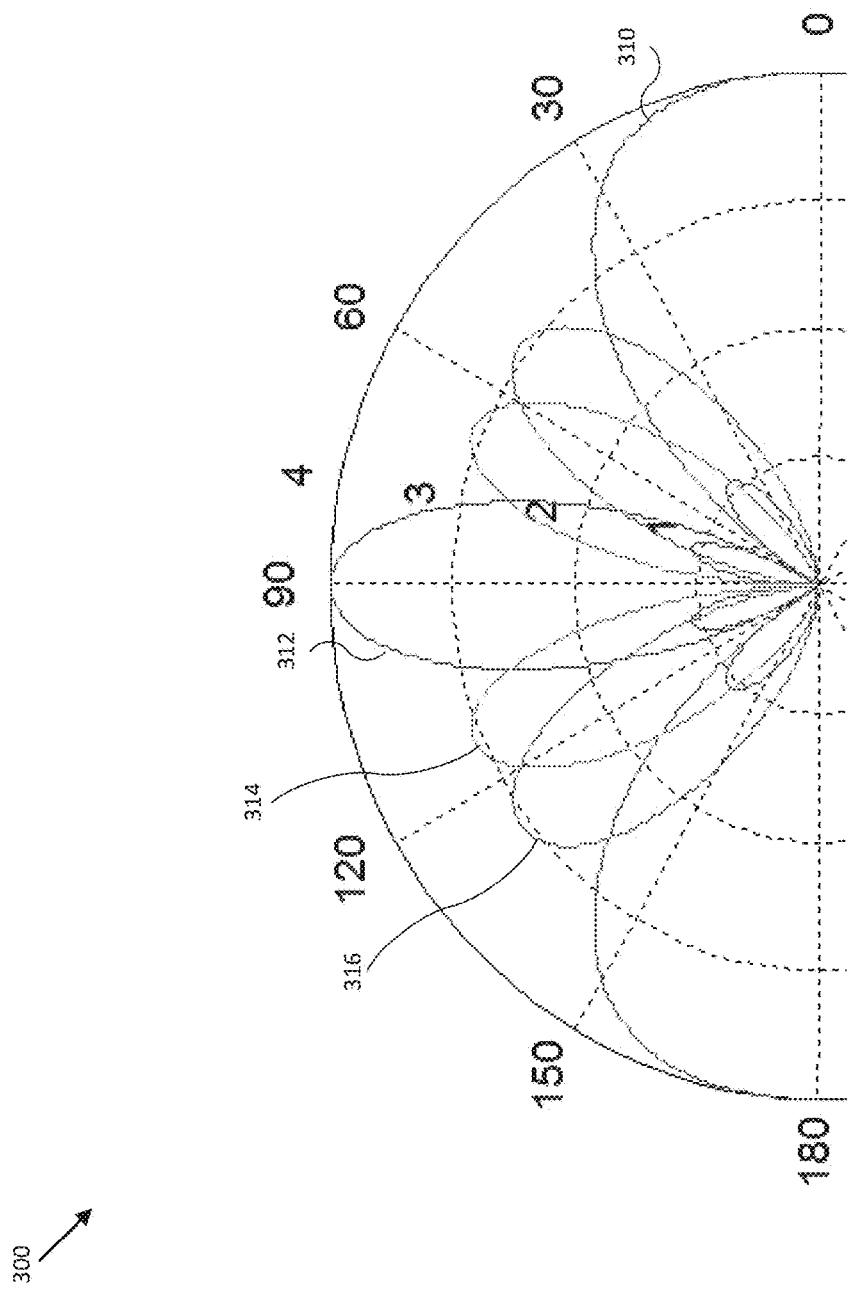
FIG. 3 illustrates a graph of radiation patterns corresponding to different channels designated by a Hadamard matrix in accordance with an embodiment of the disclosure.

The beams from Hadamard matrices $M_{TX}$ or $M_{RX}$ are not necessary narrow beam and are typically a wide beam with multiple peaks. For example, FIG. 3 illustrates a graph 300 of radiation patterns 310-316 corresponding to different channels designated by a Hadamard matrix in accordance with an embodiment of the disclosure. More specifically, FIG. 3 shows the four transmitter or receiver beams formed by a four element linear array oriented horizontally along the page in FIG. 3 (e.g., a linear antenna array aligned with the dashed line from 0 degrees to 180 degrees) corresponding to the different channels designated by a 4×4 Hadamard matrix (e.g., where each row or column corresponds to a different Hadamard transmitter/receiver channel generating patterns 310-316) where two patterns (e.g., 310 and 315) exhibit two relatively large primary peaks and do not pick up sufficient energy (are relatively low gain) outside the directions/angles corresponding to their two primary peaks. In some embodiments, a DFT matrix (another type of orthogonal matrix, with some characteristics similar to those of a Hadamard matrix) can be used instead of a Hadamard matrix in order to provide very good/relatively high gain peaks with relatively complete angular coverage. More generally, other orthogonal matrices may be used in place of the Hadamard matrix, in the methods described herein, and can in some embodiments be modified, reduced, or selected to have relatively simplified individual entries (e.g., real and/or complex) to reduce computational loads yet provide relatively complete angular coverage over a selected range of angles. As can be seen from FIG. 3, if the primary concern is detecting objects within the angle ±45° to the front, some Hadamard patterns (e.g., 310 and possibly 314) in $M_{TX}$ or $M_{RX}$ are mostly outside the primary detection area and would constitute wasted effort if searched/measured. In such embodiments, DFT or other orthogonal matrix patterns may be used for $M_{TX}$ or $M_{RX}$.

In embodiments where relation (2) is used to determine channel matrix H, all NM measurements are required to produce the full measurement matrix A. In alternative embodiments, instead of using square Hadamard matrices (or similar DFT matrices) $M_{TX}$ and $M_{RX}$, a K×N transmitter AWV matrix $X_{TX}$ and an M×L receiver AWV matrix $Y_{RX}$ may be used for a total of K*L measurements. $X_{TX}$ and $Y_{RX}$ may be formed such that all K*L measurements are focused within a particular subset of the available detection area in view of the transmitter and receiver arrays (e.g., in a designated detection area, around object(s) within a designated detection area, and/or areas where the objects have previously been detected). When the row or column of the AWV matrices $X_{TX}$ and $Y_{RX}$ are applied to the phase shifters (or AWVs) for each antenna array, a K×L measurement matrix A is obtained. Once measurement matrix A is obtained, AoA(s) and AoD(s) may be determined by performing SVD of measurement matrix A to obtain $A=U\Lambda V^H$ and selecting some number of strongest paths from the decomposition of measurement matrix A (e.g., corresponding to the largest singular values in the decomposition) to determine corresponding AoA(s) and AoD(s). For example, the k-th strongest path corresponds to $u_k$ and $v_k$ (e.g., referred to herein generally as "measurement matrix singular vectors") in the decomposition of measurement matrix A, the corresponding AoD is derived from the directional vector along the k-th strongest path to the object in the same direction as $Zu_k^H$, and the corresponding AoA is derived from the directional vector along the k-th strongest path from the object in the same direction as $Wv_k^H$, where Z and W are matrices based on $X_{TX}$ and $Y_{RX}$. As used herein, Z and W may be referred to generally as "transformation matrices" configured to transform measurement matrix singular vectors (e.g., $u_k$ and $v_k$) into directional vectors within the focused detection area designated by AWV matrices $X_{TX}$ and $Y_{RX}$.

In one embodiment, Z and W may be selected such that $Z=X_{TX}$, and $W=Y_{RX}$, where the directional vectors are simply the sum of weighted AWV vectors in $X_{TX}$ and $Y_{RX}$ with weights equal to $u_k^H$ and $v_k^H$, respectively. In another embodiment, Z and W may be selected as the pseudoinverse of $X_{TX}^H$ or $Y_{RX}^H$. For example, when K is not greater than N, $Z=X(X^HX)^{-1}$, and when L is not greater than M, $W=Y(Y^HY)^{-1}$. This approximates the directional vectors using the linear combination of the column spaces of $X_{TX}$ and $Y_{RX}$, respectively. This also minimizes the norm of the difference between the combined directional vectors and the ideal vectors projected onto the column spaces of $X_{TX}$ and $Y_{RX}$, respectively. In a further embodiment, the matrices of $X^HX$ or $Y^HY$ may be ill-conditioned when the rows of $X_{TX}$ and $Y_{RX}$ are linear dependent or close to linear dependent. The pseudoinverses of $X_{TX}^H$ and $Y_{RX}^H$ may be obtained via its corresponding SVD. For example, instead of using all non-zero singular values in the SVD, small (e.g., up to a predetermined threshold) singular values may be zeroed for more efficient matrix multiplication.

In various embodiments, the AWVs in both $X_{TX}$ and $Y_{RX}$ do not need to be orthogonal to each other, and $X_{TX}$ and $Y_{RX}$ do not need to be square or orthogonal matrices. To reduce measurement time and processing resources, the number of rows in $X_{TX}$ and the number of columns in $Y_{RX}$ may be substantially smaller than the number of transmit and receive antennas, respectively. To improve measurement SNR, the number of rows in $X_{TX}$ and number of columns of $Y_{RX}$ may be increased for a corresponding SNR increase. In a typical embodiment, the AWVs in both $X_{TX}$ and $Y_{RX}$ may be selected so as to be close to the AoD and AoA (e.g., determined in a previous step, using the same or different method to detect the position of an object), respectively, to improve the system SNR. In various embodiments, the choice of $Z=X_{TX}$ and $W=Y_{RX}$ may simplify system design, both in terms of software (e.g., to reduce computational complexity and/or load) and hardware (e.g., to reduce area and power dedicated to computational resources, and/or to simplify and/or streamline other hardware design characteristics).

Angle Detection

In radar applications, the phase of the signal response from a transmitter to a receiver largely depends on the total travel distance of the signal; starting from the transmitter, reflecting from an object, and arriving at the receiver. In various embodiments, phase information from multiple transmitters and receivers (in respective arrays) can be used to detect the position (relative angle and range) and angular velocity of the object. For example, in embodiments where transmitter antenna array 124 and receiver antenna array 128 of system 110 each include multiple antenna elements, the travel distances between adjacent elements is equal to $\Delta l = d \sin \theta$, where d is the distance between elements and $\theta$ is the angle between the broadside direction of the antenna array and the object (e.g., the complement of the angle between the array normal vector and the vector between the antenna element and the object), as already used in the directional vector for (3). Where the adjacent antenna element pair are receivers, $\theta$ may correspond to $\theta_r$ in FIG. 1, and where the adjacent antenna element pair are transmitters, $\theta$ may correspond to $\theta_t$ in FIG. 1, for example. This travel difference is related to the phase difference ($\Delta\alpha$) between pairs of antenna elements by:

$$\Delta\alpha = 2\pi \times \frac{\Delta l}{\lambda} = \frac{2\pi d}{\lambda}\sin\theta, \qquad (5)$$

where $\lambda$ is the wavelength of the RF signal, similar to the corresponding relation in (3).

Based on a pair-wise comparison between antenna elements (e.g., between the channel response of [transmitter element 1→receiver element 1] and the channel response of [transmitter element 1→receiver element 2] from object 130, as an example), ideally, one may obtain the same phase difference $\Delta\alpha$ for all pair-wise angle measurements (e.g., a direct measurement method). In practice, this phase difference may be corrupted by noise or other distortions. In some embodiments, an averaging over multiple pair-wise angle comparisons may be used to reduce noise.

In addition to deriving an angle (e.g., AoA, AoD) by pair-wise comparison between adjacent antenna elements, there are other algorithms that may be used to obtain AoA and AoD. For a linear array, many methods are possible, such as MUSIC (MUltiple SIgnal Classification) and ESPRIT (Estimation of Signals Parameters via Rotational Invariance Techniques). In various embodiments, such algorithms can be extended to two-dimensional arrays and/or can be used to identify the arrival or departure angles corresponding to multiple targets.

Pair-Wise Comparison of Phases

Figure 4A:
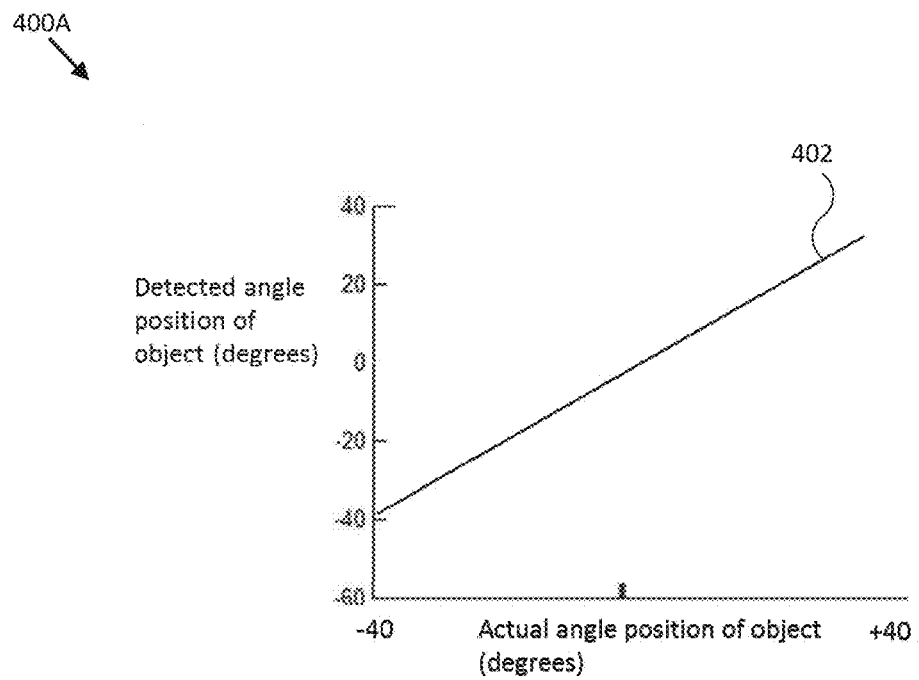
FIGS. 4A-D illustrate graphs of detected angular position against actual angular position for various detection methods in accordance with an embodiment of the disclosure.

In various embodiments, object detection system 110 may be configured to detect angular position of object 130 by directly using equation (5) to compare the phases of transceivers in pairs. For example, FIG. 4A illustrates a graph 400A of detected angular position against actual angular position when everything is ideal (i.e., antennas patterns are perfectly isotropic, the object size is infinitesimally small, so that angle position is well-defined, and all the reflected energy is contributed from the single object). As shown in FIG. 4A, line 402 shows the series of detected angular positions equals the series of actual angular positions over the full range of motion (e.g., of object 130 across surface 111 of object sensing system 110).

Figure 4B:
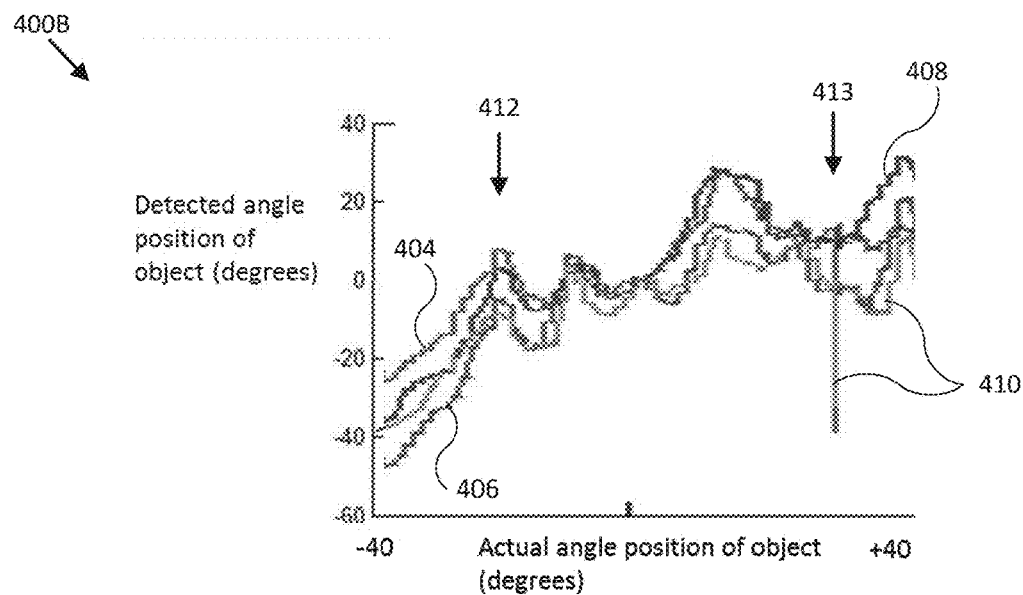

However, in practice, radiation patterns of antenna elements/arrays are not uniform across the available range of detection angles. Furthermore, when a size of object 130 is larger than the wavelength of the RF signal (e.g., the radar probe signal) emitted by transmitter array 124, any non-uniform radiation pattern across the size of object 130 changes the effective distance of object 130 as seen from receiver array 128. For example, assume that object 130 is spatially distributed discretely at distance of d_1 at $\theta$_1 to distance d_2 at θ_2, where d_1<d_2 (in order to simplify this explanation). If the transmitter/receiver radiation pattern is uniform, the phase will be more dominantly decided by d_1 because it is closer. However, if the radiation pattern has higher gain along the direction of θ_2, the phase will be more dominated by the structure at d_2. Because the size of object 130 is larger than the wavelength of the RF signal, the phase variation in the various channel responses can be significant. Moreover, the radiation pattern can be quite different from one antenna element/array to another due to environmental differences between antennas. This means that the effective distance difference between a pair of receivers can deviate from d*sin(θ), and hence, the angle-phase difference relation of equation (5) becomes inaccurate. Different phase/radiation patterns among transceiver antennas can also contribute to such errors. Consequently, in practice, the naïve angle estimation using equation (5) may bring about substantial errors, as shown in FIG. 4B. FIG. 4B illustrates a graph 400B of detected angular positions against actual angular positions under actual conditions using different pairs of receive antenna elements in receiver array 128 for a sweeping of object 130 above surface 111. As shown in FIG. 4B, curves 404, 406, 408, and 410 show the various series of detected angular positions against the actual angular positions using four different pairs of receive antenna elements in receiver array 128, and curve positions 412 and 413 indicate example non-linear behavior exhibited by all measurements at approximately −20 degrees and +30 degrees. In some embodiments, multiple angle measurements from different pairs (e.g., different curves 404-410) can be averaged to combine the angle estimation from each pair of antennas to increase signal-to-noise ratio (SNR) in the series of position measurements.

Figure 4C:
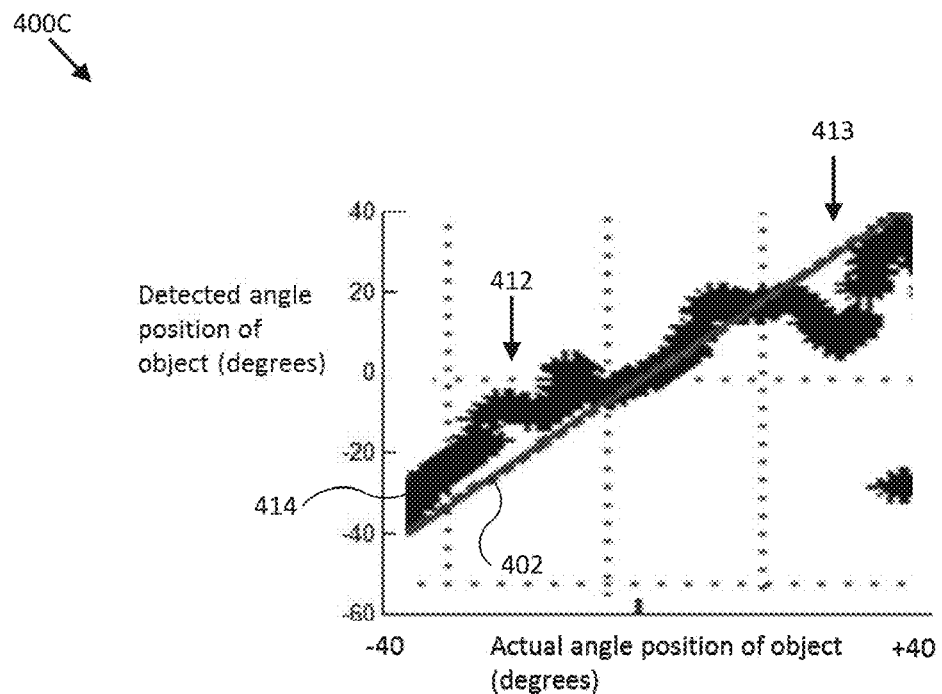

In other embodiments, object detection system 110 may be configured to apply SVD to the measurements to increase the SNR and/or determine the series of angle measurements. As noted herein, SVD is a method that can be used to detect AoDs and AoAs in radar applications. However, when all pairs of receive antennas consistently show the non-linear behavior portions 412, 413, as shown in FIG. 4B, SVD based on the channel responses typically also suffers from similar problems, as shown in FIG. 4C (non-linear behavior portions 412 and 413 at approximately −20 degrees and 30 degrees, respectively, in FIG. 4B are evident in SVD method result shown in FIG. 4C). FIG. 4C illustrates a graph 400C of detected angular position against actual angular position under actual conditions using SVD analysis applied to the channel responses from a sweeping of object 130 above surface 111. As shown in FIG. 4C, curve 414 shows the series of detected angular positions against the actual angular positions resulting from using SVD analysis on measurements provided by object sensing system 110.

Tabulated Calibration

In some embodiments, object sensing system 110 may be configured to detect one or more angular positions of object 130 by comparing measurements against previous tabulated calibration data. Such methods can be particularly useful when various characteristics (e.g., shape, size, dielectric property) of object 130 are well-defined and fixed/known (e.g., such as the reasonably variable characteristics of a human finger). For example, different radiation/phase patterns of each antenna may be measured under known conditions and used to calibrate and/or form the tabulated calibration data (e.g., for different types of objects, different or ranges of sizes of object, and/or other calibration conditions), so that an accurate detection can be obtained by comparing measurements against the tabulated calibration data.

For example, in various embodiments, channel responses of every pair of transmitters and receivers may be measured and tabulated across all the interested range of angles (e.g., −40 to 40 degrees, −80 to +80, and/or different ranges, for example, that can correlate to a shape, size, and/or other characteristic of transmitter array 124 and/or receiver array 128, for example) and object characteristics. The resulting measured channel responses may in some embodiments be normalized with respect to the range of magnitudes, so that the results are invariant with respect to the distance to object 130. Channel responses may also be combined (e.g., conjugate multiplied) between receivers/transmitters, so that the phase of each product is related to the phase difference in equation (5). Once measured during the calibration process, conjugate multiplied channel responses in the tabulated calibration data may be used as calibrated references to determine the angle position of object 130.

Figure 4D:
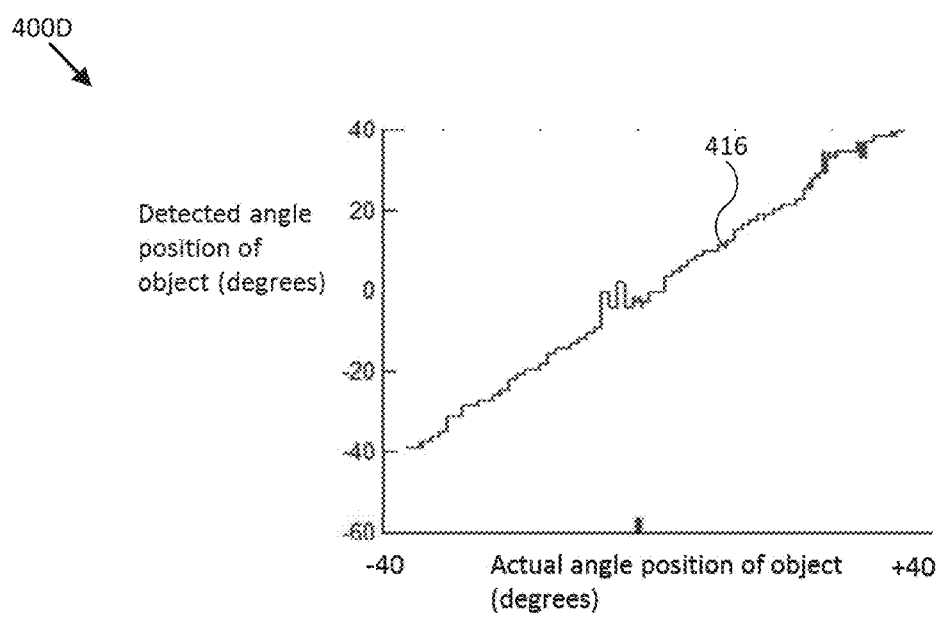

For example, newly measured channel responses may be normalized, conjugate multiplied, and the results compared with corresponding calibrated reference values. The calibrated reference values numerically closest to the processed newly measured channel responses may indicate the angular position of object 130. Embodiments of this method can take into account all the non-ideal behavior of transmitter array 124 and/or receiver array 128 and therefore produce relatively accurate results, as shown in FIG. 4D. FIG. 4D illustrates a graph 400D of detected angular position against actual angular position under actual conditions by comparing tabulated calibration values to processed (e.g., normalized, conjugate multiplied) channel responses from a sweeping of object 130 above surface 111. As shown in FIG. 4D, curve 416 shows the series of detected angular positions against the actual angular positions resulting from using tabulated calibration value comparison applied to measurements provided by object sensing system 110.

Regardless of the method used to determine the series of detected angular positions (direct method or naïve angle estimation, SVD, tabulated calibration), system 110 may be configured to determine an instantaneous angular velocity by subtracting adjacent detected angular positions, for example, or to determine an average angular velocity for the series by averaging all or a select number of instantaneous angular velocities in the series (e.g., selected to reject non-physical or relatively noisy instantaneous angular velocities, for example).

Angular Velocity Analysis

In a linear array, the AoA or AoD with respect to a detected object, measured at consecutive times, can be used to calculate corresponding frequency components, similar to performing a Doppler frequency calculation in the propagation direction. As the object moves, the peaks of the frequency component in the series of AoAs or AoDs correspond to the speed and direction (e.g., velocity) of the angular movement.

For example, if the measured AoAs or AoDs (e.g., using the SVD methods described herein) are conformed to a time series of:

$$\exp\left(j\frac{2\pi d}{\lambda}\sin\theta_1\right), \exp\left(j\frac{2\pi d}{\lambda}\sin\theta_2\right), \ldots, \text{ and } \exp\left(j\frac{2\pi d}{\lambda}\sin\theta_n\right), \quad (6.1)$$

which, using (5) and (3) can be interchangeably expressed as:

$$\exp(j\Delta\alpha_1), \exp(j\Delta\alpha_2), \ldots, \text{ and } \exp(j\Delta\alpha_n), \quad (6.2)$$

the discrete Fourier transform (DFT) of the series can be calculated in order to perform frequency analysis on the time series. In the above series, the indexes of $\Delta\alpha$ and $\theta$ refer to measurement instances in a time series of measurements each performed using any of the methods described herein, including the SVD method to determine $\theta t$ and/or $\theta r$. Using an n-point fast Fourier transform (FFT), the peak of the frequency of (6.1) or (6.2) corresponds to the average angular speed of the detected object over the series. The individual phase differences $\Delta\alpha_i$, i=1, . . . , n of (6.2) are individually the same as the phase difference in (5), but taken at different times with an index i. Typically, the time interval between measurements is substantially uniform.

In some embodiments, the time series (6.1) or (6.2) may include an associated indexed amplitude of $\sigma_1, \sigma_2, \ldots, \sigma_n$ (indexed by measurement instance) that is the singular value of an associated beam (e.g., a transmitter or receiver beam formed along the directional vector towards/from the detected object), determined using the methods described herein. In some embodiments, the singular value of the beam may be combined with the time series (6.2) such that the time series becomes:

$$\sigma_1 \exp\left(j\frac{2\pi d}{\lambda}\sin\theta_1\right), \sigma_2 \exp\left(j\frac{2\pi d}{\lambda}\sin\theta_2\right), \quad (7.1)$$
$$\ldots, \text{ and } \sigma_n \exp\left(j\frac{2\pi d}{\lambda}\sin\theta_n\right),$$

or $$\sigma_1 \exp(j\Delta\alpha_1), \sigma_2 \exp(j\Delta\alpha_2), \ldots, \text{ and } \sigma_n \exp(j\Delta\alpha_n), \quad (7.2)$$

As appropriate, and the FFT of the amplitude-refined time series (7.1), (7.2) takes into account the change of the amplitude of the beam over the time series. This can be particularly beneficial when determining the angular velocity because a relatively small amplitude of $\sigma_1, \sigma_2, \ldots, \sigma_n$ typically indicates measurements with relatively low reliability. Therefore, including the amplitudes $\sigma_1, \sigma_2, \ldots, \sigma_n$ when determining the FFT, and thereby the angular velocity, helps emphasize more reliable/less noisy measurements (e.g., corresponding to stronger measured signals/closer objects) in the time series of measurements over less reliable/more noisy measurements in the time series of measurements, and so the most reliable measurements provide the largest per measurement contribution to the resulting angular velocity determination. As a result, the determined angular velocity is rendered more reliable by including the amplitudes as in (7) rather than omitting the amplitudes as in (6.1) and/or (6.2).

Also, while (711) and (7.2) use amplitudes $\sigma_1, \sigma_2, \ldots, \sigma_n$, it should be understood that similar methods may be used to track multiple objects k across the time series, each with their own singular value $\sigma_{1,k}, \sigma_{2,k}, \ldots, \sigma_{n,k}$, and their own of $\Delta\alpha_{n,k}$ and $\theta_{n,k}$ and system 110 may be configured to determine multiple different angular velocities corresponding to multiple different tracked objects using the methods described herein.

As noted herein, any of the methods described herein with respect to a linear antenna array may be extended to detect similar characteristics of an object relative to a two dimensional or three dimensional antenna array. For example, for a two dimensional antenna array, the AoA and AoD may include both elevation angles $\theta$ and azimuthal angles $\varphi$, and the angular velocity may be calculated based on a time series of phase differences $\Delta\alpha_x$ and $\Delta\alpha_y$ corresponding to the geometry of the two dimensional antenna array. In some embodiments, using (5), the phase differences $\Delta\alpha_x$ and $\Delta\alpha_y$ may be obtained separately and used to determine $\theta$ and $\varphi$ from $\sin\theta_x = \sin\theta\cos\varphi$ and $\sin\theta_y \sin\theta\sin\varphi$. The singular value of the corresponding beam may be included in the calculation of the angular velocity, similar to the relation in (7). For example, for a two dimensional rectangular array, the phase differences $\Delta\alpha_x$ and $\Delta\alpha_y$ may be obtained separately, the time series (6) or (7) may be formed (e.g., with or without including the singular value of the corresponding beam), and the FFT of the time series may be calculated accordingly.

In various embodiments, angular position and/or velocity may be used to detect a human finger, differentiate a human finger from a stylus or other objects, and/or to perform gesture recognition, for example. For example, a human finger may have a size, dielectric property, shape, or other static characteristic that differentiates it from other objects, such as a relatively thin metal or plastic stylus. In addition, an angular velocity of a human finger may be differentiated from that of another object based on speed, hesitation transients, vibration amplitudes and frequencies (e.g., pulse), gesture pattern (e.g., taking into account finger joints, for example).

Matching Pursuit for Range Calculation

For any particular channel (pair-wise, Hadamard designated, or other designated channel), the impulse response is just the superposition of many impulses, corresponding to different possible paths (corresponding to different positions for object 130) between transmitter antenna array 124 and receiver antenna array 128. Including the electronic circuitry, especially some baseband filtering at the transmitter and receiver, the overall impulse response of a channel may be represented by:

$$h(t) = \Sigma_k c_k p(t - t_k) \quad (8)$$

where $c_k$ is the complex amplitude for each path, and $t_k$ is the timing differences between the transmitter antenna array and the receiver antenna array, corresponding to the ratio of path length to light speed. By accurate measurement of $t_k$, the distance between the transmitter antenna array, the object, and the receiver antenna array can be found. Where the transmitter and receiver antenna elements are substantially co-located (e.g., their separation distance is small compared to the path distance), the distance or range of the object to the transmitter and receiver antenna elements will be approximately $\frac{1}{2}t_k c$, where c is the speed of light. Mathematically, the time $t_k$ may be slightly different to or from different antenna elements in an antenna array. In practice, the path difference to different antenna elements in typical compact object detection systems is on the order of a wavelength and the corresponding timing difference is too small to be measured and/or taken into account when determining range to an object.

Under typical operating conditions, the measured impulse response may be represented by:

$$h(t) = \Sigma_k c_k p(t - t_k) + n(t) \quad (9)$$

including additional noise n(t). In various embodiments, a modified matching pursuit process may be used to find the values of $t_k$ and thus the distance of the object. For example, instead of using discrete dictionaries as in an unmodified matching pursuit process, a continuous dictionary may be used. In addition, instead of a continuous impulse response h(t), the impulse response may be the discrete version $h_n$=h(nT), where T is the sampling period. The waveform p(t) may be measured in a calibration process and can be assumed to be known. In various embodiments, a modified matching pursuit process may include assigning k=1, $h_n^{(k)}$=$h_n$; searching $t_k$ to maximize $|c_k|$; finding $h_n^{(k+1)}$=$h_n^{(k)}$−$c_k$p(nT−$t_k$); incrementing k and repeating for k objects, where:

$$c_k = \frac{\sum_n h_n^{(k)} p^*(nT - t_k)}{\sqrt{\sum_n |p(nT - t_k)|^2}}. \qquad (10)$$

In various embodiments, the search to maximize $|c_k|$ may be terminated based on preset limit conditions for $t_k$, compute time or resources, number of search iterations, and/or other search termination conditions. In general, the accuracy of $t_k$ is directly proportional to SNR but inversely proportional to the sampling time T. Various methods may be used to increase SNR, such as taking multiple measurements of the impulse response (e.g., transmitting multiple impulses, receiving and/or digitizing multiple impulse responses) and averaging the multiple impulse responses to reduce the noise component n(t), modulating the transmitted impulse according to a known pseudorandom sequence (e.g., a relatively small m-sequence) and then applying a correlation filter corresponding to the known modulation sequence to the measured impulse response to reduce the noise component (e.g., similar to spread spectrum systems), and/or other similar process gain methods, which may be used individually or in combinations as appropriate. While taking multiple measurements and averaging is the simplest method to reduce noise, such methods can reduce range update resolution or require a reduced sampling time/increased sampling rate, which can undesirably increase the computational load.

The sampling time T can also be reduced to increase accuracy of $t_k$, but if time-adjacent impulses are too close to each other, and depending on the shape of the waveform p(t) and overall channel/system SNR, the channel response may effectively merge into a single impulse and render the process inefficient and/or inaccurate/unreliable. Typical sampling rates of embodiments of the present disclosure can approach 2-3 GHz and produce reliable results. More generally, such matching pursuit method may include the steps of measuring an impulse response of a channel, finding a maximum matched timing of a time-shifted reference impulse response p(t) relative to the measured impulse response (e.g., detecting an object/surface), subtracting the maximum matched reference impulse response from the measured response, and iterating until a desired number of objects/surfaces are found.

Figure 5:
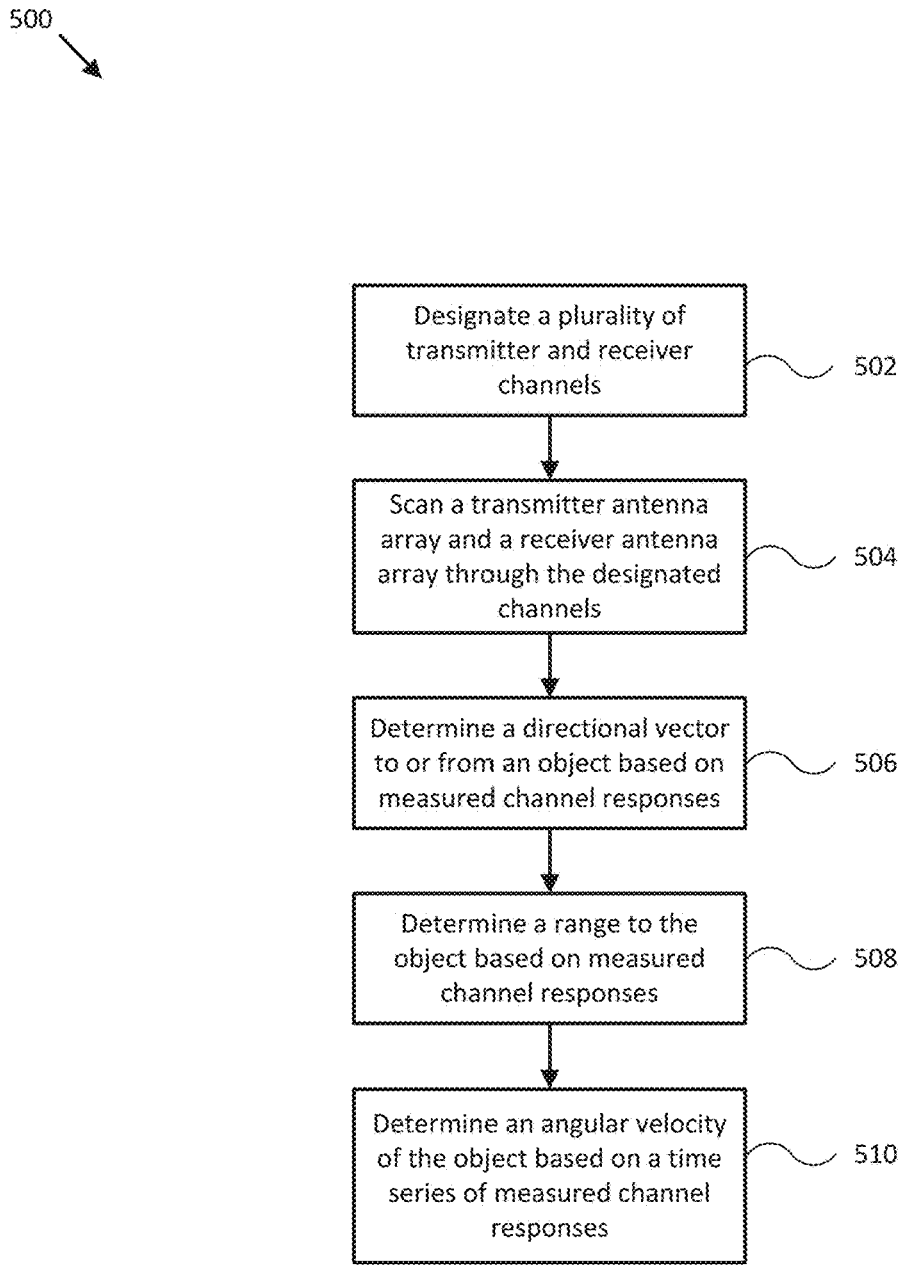
FIG. 5 illustrates a process to detect the relative position of an object using an object sensing system in accordance with an embodiment of the disclosure.

FIG. 5 illustrates a process 500 to detect the relative position (e.g., angle and/or range) of object 130 using object sensing system 110 in accordance with an embodiment of the disclosure. In some embodiments, the operations of FIG. 5 may be implemented as software instructions executed by one or more logic devices associated with corresponding electronic devices, sensors, and/or structures depicted in FIGS. 1 through 2E. More generally, the operations of FIG. 5 may be implemented with any combination of software instructions and/or electronic hardware (e.g., inductors, capacitors, amplifiers, actuators, or other analog and/or digital components). It should be appreciated that any step, sub-step, sub-process, or block of processes 500 may be performed in an order or arrangement different from the embodiments illustrated by FIG. 5. For example, in other embodiments, one or more blocks may be omitted from process 500, and other blocks may be included. Furthermore, block inputs, block outputs, various sensor signals, sensor information, calibration parameters, and/or other operational parameters may be stored to one or more memories prior to moving to a following portion of process 500. Although process 500 is described with reference to system 110 and FIGS. 1-2E, process 500 may be performed by other systems different from system 110 and including a different selection of electronic devices, sensors, assemblies, and/or antenna arrangements. At the initiation of process 500, various system parameters may be populated by prior execution of a process similar to process 500, for example, or may be initialized to zero and/or one or more values corresponding to typical, stored, and/or learned values derived from past operation of process 500, as described herein.

In block 502, a logic device designates a plurality of transmitter and receiver channels. For example, controller 112 and/or co-controller 120 of object sensing system 110 may be configured to designate a plurality of transmitter and receiver channels for transmitter antenna array 124 and receiver antenna array 128 of object sensing system 110. In some embodiments, controller 112 may be configured to designate the plurality of transmitter and receiver channels by forming a transmitter AWV matrix (e.g., $M_{TX}$ or $X_{TX}$) comprising one or more transmitter AWVs corresponding to each transmitter channel in a desired plurality of transmitter and receiver channels, and by forming a receiver AWV matrix (e.g., $M_{RX}$ or $Y_{RX}$) comprising one or more receiver AWVs corresponding to each receiver channel in the desired plurality of transmitter and receiver channels. In such embodiments, the transmitter AWV matrix and the receiver AWV matrix may each comprise a Hadamard matrix (e.g., $M_{TX}$ or $M_{RX}$), as described herein.

Alternatively, the transmitter AWV matrix and the receiver AWV matrix may each comprise AWVs configured to focus the designated channels within a particular subset of an available detection area (e.g., $X_{TX}$ or $Y_{RX}$), such as after initially detecting an object and desiring to track the object more efficiently or with higher angular resolution. In other embodiments, the designated channels may be selected to correspond to different transmitter or receiver beam angles relative to emission surface 111 of the transmitter antenna array and/or the receiver antenna array, which can also be used as a simplified method to scan a designated area for object 130. In still further embodiments, the designated channels may correspond to pairs of individual antenna elements comprising one antenna element from each of transmitter antenna array 124 and receiver antenna array 128.

In block 504, a logic device scans a transmitter antenna array and a receiver antenna array through designated channels. For example, controller 112 and/or co-controller 120 may be configured to scan transmitter antenna array 124 and receiver antenna array 128 through the channels designated in block 502 to measure channel responses corresponding to each one of the designated channels. In some embodiments, controller 112 may be configured to form a measurement matrix (e.g., A) comprising entries corresponding to each measured channel response. In such embodiments, controller 112 may be configured to derive a channel matrix (e.g., H) from the measurement matrix and the transmitter and receiver AWV matrices designated in block 502. In alternative embodiments where the designated channels correspond to pairs of individual antenna elements comprising one antenna element from each of the transmitter antenna array and the receiver antenna array, controller 112 may be configured to form a channel matrix comprising entries corresponding to each measured channel response.

In block 506, a logic device determines a directional vector to or from an object based on measured channel responses. For example, controller 112 and/or co-controller 120 may be configured to determine directional vector 140 and/or 144 to or from object 130 based, at least in part, on the channel responses measured in block 504. In some embodiments, controller 112 may be configured to determine directional vector 140 and/or 144 to or from object 130 by performing singular value decomposition on the channel matrix provided in block 504 to determine at least a largest singular value corresponding to directional vector 140 or 144 to or from nearest point 132 of object 130. In other embodiments, controller 112 may be configured to determine directional vector 140 and/or 144 to or from object 130 by performing singular value decomposition on the measurement matrix to determine at least a largest singular value and a corresponding measurement matrix singular vector, and by applying a transformation matrix based on the transmitter or receiver AWV matrix provided in block 504 to the measurement matrix singular vector to transform the measurement matrix singular vector into directional vector 140 or 144 to or from object 130.

In further embodiments, where the channel matrix is formed by scanning pairs of individual antenna elements, controller 112 may be configured to determine directional vector 140 and/or 144 to or from object 130 by performing singular value decomposition on the channel matrix to determine at least a largest singular value corresponding to directional vector 140 and/or 144 to or from object 130. In yet further embodiments where the designated channels correspond to different transmitter or receiver beam angles, controller 112 may be configured to determine directional vector 140 or 144 to or from the object, in the form of an AoD or an AoA, by identifying one of the measured channel responses provided in block 504 comprising a peak signal level and setting the AoD or the AoA to the transmitter or receiver beam angle corresponding to the one measured channel response comprising the peak signal level.

In alternative embodiments, controller 112 may be configured to determine a plurality of phase differences between signals in the measured channel responses provided in block 504, corresponding to pairs of adjacent antenna elements within either transmitter antenna array 124 or receiver antenna array 128, and then to determine the directional vector 140 or 144 to or from object 130, in the form of an AoD or an AoA, by averaging the plurality of determined phase differences and converting the resulting average phase difference into the AoD or AoA according to equation (5). In embodiments where transmitter antenna array 124 and/or receiver antenna array 128 comprises a two dimensional antenna array having first and second major axes 250, 252, controller 112 may be configured to determine a first plurality of phase differences between signals in the measured channel responses corresponding to adjacent antenna elements along the first major axis 250 within either transmitter antenna array 124 or receiver antenna array 128, to determine a second plurality of phase differences between signals in the measured channel responses corresponding to adjacent antenna elements along the second major axis 252 within either transmitter antenna array 124 or receiver antenna array 128, and then to determine directional vector 140 or 144 to or from object 130, in the form of an angle of departure (AoD) or an angle of arrival (AoA), by averaging the first plurality of determined phase differences, separately averaging the second plurality of determined phase differences, and converting the resulting first and second average phase differences into the AoD or AoA.

In further embodiments, controller 112 may be configured to determine a plurality of phase differences between signals in the measured channel responses provided in block 504, corresponding to pairs of "integer adjacent" antenna elements within either transmitter antenna array 124 or receiver antenna array 128 (e.g., spatially adjacent elements, and elements an integer number of antenna array spacing d away from each other according to equation (5), both circumstances hereby generally defined as "integer adjacent"), and then to determine the directional vector 140 or 144 to or from object 130, in the form of an AoD or an AoA, by averaging the plurality of determined phase differences, each normalized by the corresponding integer of their integer spacing, and converting the resulting average phase difference into the AoD or AoA according to equation (5).

In still further embodiments, where the channel matrix is formed by scanning pairs of individual antenna elements, controller 112 may be configured to determine directional vector 140 and/or 144 to or from object 130 by comparing tabulated calibration values to corresponding measured channel responses in the channel matrix. For example, system 110 may be configured to perform a calibration process (e.g., shortly after manufacture) including measuring the channel responses of various calibration objects as each is presented to system 110/surface 111 over a particular range of AoDs and AoAs. Each calibration object may include a variety of characteristics, such as shape, size, dielectric property, and/or other object characteristics, for example, and may be presented to system 110/surface 111 according to different calibration procedures, such as at different ranges from surface 111, according to different ranges or resolutions of AoDs and AoAs, at different relative orientations, and/or other calibration procedures configured to calibrate system 110 according to expected object characteristics and detection circumstances. The resulting calibrated channel responses may be tabulated according to one or more calibration object characteristics and/or detection circumstances, and the known AoDs and/or AoAs (e.g., directional vectors to or from the calibration object), to form the tabulated calibration data or values.

In some embodiments, the tabulated channel responses may be normalized according to their individual magnitudes to render the corresponding calibrated reference values substantially invariant with respect to a range or distance to a detected object. Additionally, channel responses corresponding to adjacent or integer adjacent transmitter or receiver pairs may be combined (e.g., conjugate multiplied, or otherwise combined) such that the phase of the combined signal (e.g., the product, if conjugate multiplied) is related/proportional to the phase difference in equation (5). Once the tabulated calibration data is determined (e.g., channel responses, normalized channel responses, normalized and combined channel responses, as described herein), the tabulated calibration data may be used to determine the AoD and AoA and/or series of AoDs and AoAs of an object.

For example, controller 112 may be configured to normalize and/or combine individual measured channel responses in the channel matrix provided in block 504 and compare the processed channel matrix values/entries to corresponding calibrated reference values in the tabulated calibration data derived as described herein. Controller 112 may be configured to determine the calibrated reference values numerically closest (e.g., minimum absolute value difference if a number, least squares fit if multiple numbers or a signal response, and/or other comparison techniques) to the processed channel matrix entries and selecting the corresponding tabulated AoA and/or AoD as the AoA and/or AoD of object 130.

In block 508, a logic device determines a range to an object based on measured channel responses. For example, controller 112 and/or co-controller 120 may be configured to determine a range to object 130 based on at least one of the measured channel responses determined in block 504 that is provided as a sampled impulse response. In some embodiments, controller 112 may be configured to perform a modified matching pursuit process that uses the sampled impulse response to determine a range from transmitter antenna array 124 and/or receiver antenna array 128 to object 130.

In block 510, a logic device determines an angular velocity of an object based on a time series of measured channel responses. For example, controller 112 and/or co-controller 120 may be configured to determine an angular velocity of object 130 based on a time series of measured channel responses provided through repeated iteration of block 504 over a period of time. In some embodiments, controller 112 may be configured to repeatedly scan transmitter antenna array 124 and receiver antenna array 128 through the channels designated in block 502 over a period of time to generate a time series of the measured channel responses provided in block 504, to determine a time series of average phase differences based on the time series of measured channel responses, and to determine an average angular velocity of object 130 from the time series of average phase differences by applying a Fourier transform to a form of the time series of average phase differences and identifying a peak in the resulting transformation as the average angular velocity.

By employing the methods described herein, including combinations of different or alternative methods, embodiments of the present disclosure are able to efficiently and reliably detect and/or differentiate between one or multiple objects within an available detection area that can be scanned by channels formed between a transmitter antenna array and a receiver antenna array. Moreover, embodiments are able to determine a relative position (angle and/or range) to the detected objects and/or a relative angular velocity of the detected objects with changes in angular position detectable to resolutions of approximately 0.1 degrees, 0.02 degrees, or less, depending on object size, shape, and range, and changes in range detectable to resolutions of approximately 1 mm or less from an average range of approximately 1 or 2 cm to approximately 3 m from surface 111. Devices using such systems and methods present a new and robust avenue for user interfaces relying on spatial detection of human fingers, stylus, and/or other user interface mechanisms.

Application to UAV Operation

In addition to communication purposes, the wireless link between an unmanned aerial vehicle and its controller can be used to measure many channel characteristics of the wireless link (e.g., link state data), including the distance between the UAV and the controller, orientation of the UAV with respect to the controller, orientation of the controller with respect to the UAV, and a line-of-sight or non-line-of-sight channel condition. Thus, the wireless link and corresponding link state data can be used for many different applications facilitated by distance measurements, power measurements, and angles of arrival and departure measurements, as described herein.

For example, a wireless link between a UAV and its controller can be used for distance measurement and power measurement. If an antenna array is used in the transmitter and/or receiver of the controller, the angles of arrival and departure can also be measured for the direction of the UAV with respect to the controller, or vice versa, using the methods described herein. When the UAV is moved from line-of-sight (LOS) to non-line-of-sight (NLOS) with respect to the controller, the measured distance, power, angles of arrival and departure each show large transients, and detection of the transient(s) can be used to infer the channel condition of the wireless link.

Figure 6:
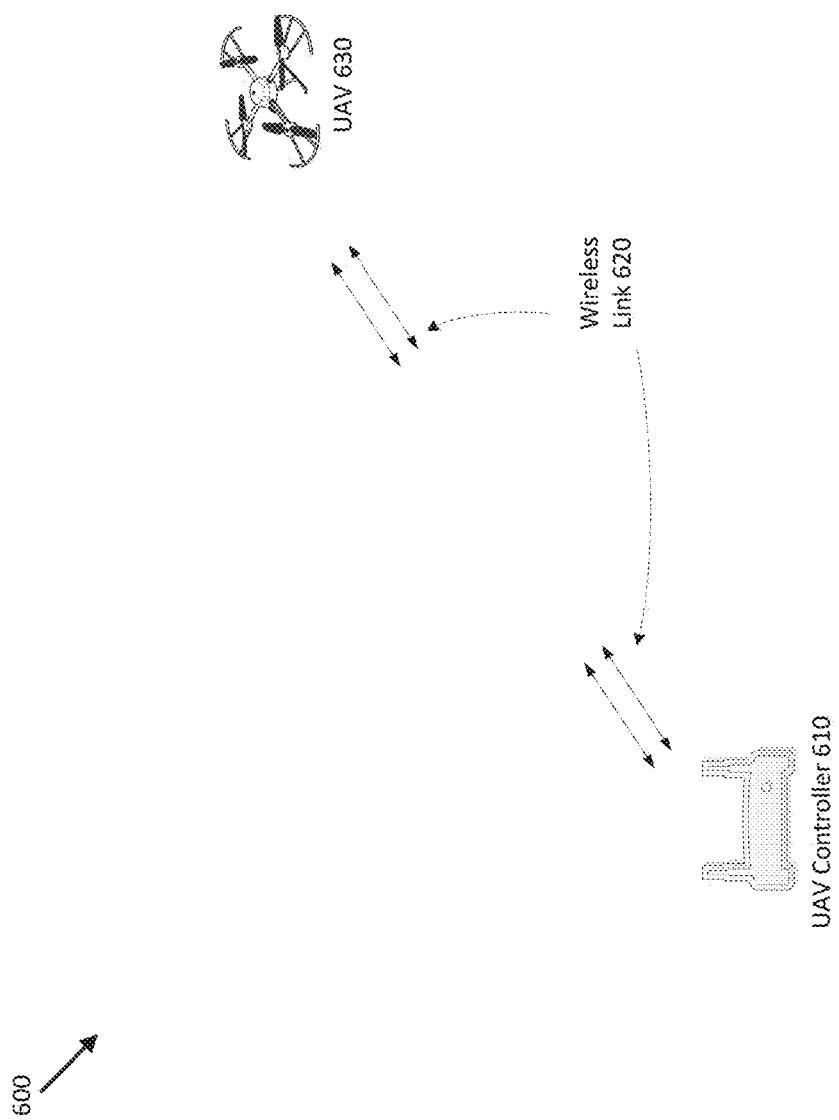
FIG. 6 illustrates a block diagram of an unmanned aerial vehicle system in accordance with an embodiment of the disclosure.

FIG. 6 illustrates a block diagram of a UAV system 600 in accordance with an embodiment of the disclosure. As shown in FIG. 6, UAV system 600 include UAV controller 610 communicating with UAV 630 over wireless link 620. In various embodiments, UAV controller 610 and/or UAV 630 may include various subsystems and modules similar to those included in object sensing system 110 of FIG. 1. For example, controller 112, memory 113, co-controller 120, transmitter 122, receiver 126, transmitter array 124, receiver array 128, communications modules 116, and/or other modules 118 may be configured to support data communications over a wireless link formed using transmitter array 124 and/or receiver array 128 between UAV controller 610 and UAV 630 of UAV system 600, in addition to the various radar-like techniques disclosed herein.

UAV controller 610 may be implemented as a remote control for UAV 630, for example, and include one or more user interfaces (e.g., joysticks, buttons, touch screens, and/or other user interfaces), displays, wireless transmission and reception systems, and/or other modules. UAV controller 610 may be configured to generate UAV controller data (e.g., a type of UAV operational data) based on user input from the one or more user interfaces and/or an autopilot (e.g., configured to generate UAV operational data to pilot UAV 630 according to one or more flight restrictions, a set of waypoints, and/or other autopilot directives) executed by UAV controller 610, for example. In some embodiments, UAV controller 610 may be configured to control operation of UAV 630 by, at least in part, transmitting UAV control data and/or UAV operational data over wireless link 620. UAV 630 may be implemented as a battery powered or combination of battery and combustion powered flight platform configured to carry a variety of sensors (e.g., other modules 118) in a flight pattern as controlled by UAV controller 630. In some embodiments, UAV 630 may be configured to control operation of UAV 630 by, at least in part, generating UAV operational data (e.g., based on an autopilot executed by UAV 630, UAV control data and/or UAV operational data received over wireless link 620, and/or other sensor data and/or UAV operational data), and using the UAV operational data to control operation of UAV 630. Wireless link 620 may be configured to support transmissions of link state data (e.g., packets and/or other signals including information regarding a state of wireless link 620) in addition to UAV operational data (e.g., control signals to control operation of UAV 630, telemetry data from UAV 630 to indicate a physical state of UAV 630, UAV control data, other sensor data from sensors mounted to UAV 630, such as GNSS, compass, and/or accelerometer/gyroscope sensors, video and/or image data from cameras mounted to UAV 630, other environmental sensors, and/or other UAV operational data for UAV system 600 that is configured to control operation of UAV 630 and/or facilitate operation of UAV 630) between UAV controller 610 and UAV 630.

In a typical UAV application, UAV controller 610 participates in a constant bidirectional wireless link 620 with UAV 630 as shown in FIG. 6. In the uplink direction from UAV controller 610 to UAV 630, the communications may typically include operational control signals/data to instruct UAV 630 to perform certain operations. In the downlink direction from UAV 630 back to UAV controller 610, the communications may typically include operational video or images from a camera, sensor information/telemetry, and other operational status information of UAV 630. In various embodiments, wireless link 620 may communicate using 900 MHz, 2.4 GHz, 5 GHz, and/or 60 GHz RF signals in the industrial, scientific, and medical (ISM) bands. In other embodiments, wireless link 620 may communicate using a licensed RF band licensed by the operator or manufacturer. In further embodiments, wireless link 620 may be an infrared optical communication signal, an ultrasonic communication signal, and/or other communication signals with different characteristic than typical RF signals.

Ranging or Distance Measurements

Figure 7:
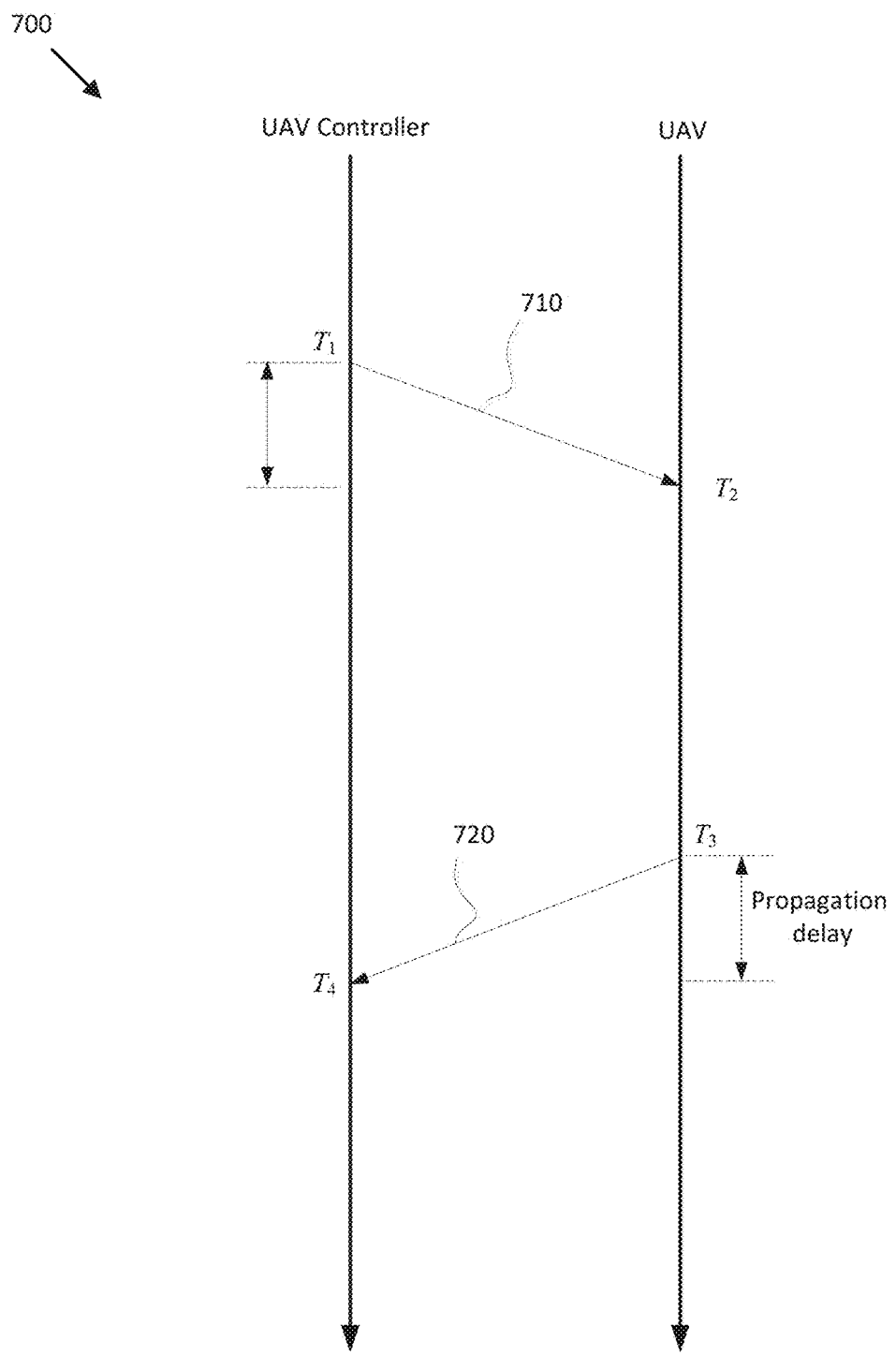
FIGS. 7-10 illustrate timing diagrams for propagation delay measurements in an unmanned aerial vehicle system in accordance with an embodiment of the disclosure.

In additional to communications, wireless link 620 can be used to find the propagation delay between UAV controller 610 and UAV 630, as shown in FIG. 7. FIG. 7 illustrates a timing diagram 700 for propagation delay measurement in UAV system 600 in accordance with an embodiment of the disclosure. Measured propagation delays can be converted to distance by multiplying the delay by the speed of light (e.g., for RF or infrared signals) or the speed of sound (e.g., for ultrasonic signals), for example. As shown in FIG. 7, in some embodiments, four time stamps may be recorded where T1 indicates when a timing measurement packet 710 leaves a transmitter antenna of UAV controller 610, T2 indicates when timing measurement packet 710 arrives at a receiver antenna of UAV 630, T3 indicates when timing measurement packet 720 leaves the transmitter antenna of UAV 630, and T4 indicates when timing measurement packet 720 arrives at the receiver antenna of UAV controller 610.

With the assumption that the propagation delay is the same in both directions due to the reciprocity property of the corresponding wireless signal, and assuming the UAV is moving relatively slowly with respect to the propagation speed, the propagation delay is:

$$d = \frac{(T_2 - T_1) + (T_4 - T_3)}{2}. \tag{11}$$

Typically, the two clocks in UAV 630 and UAV controller 610 are not locked together but run independently with a substantially fixed difference. In some embodiments, the difference between the two clocks is less than 20 ppm with respect to certain timing standards, resulting in a 40 ppm maximum difference between each other. In other embodiments, the difference of the clocks may be 50 or 100 ppm with respect to certain other timing standards. As an example, two very accurate clocks may start at random times but keep both times incrementing very accurately up to 40 ppm. In such embodiments, T2−T1 in expression (11) may be very large or even negative. Expression (1) may be rearranged to:

$$d = \frac{(T_4 - T_1) - (T_3 - T_2)}{2}, \tag{12}$$

which shows that the calculation can be performed so as to always obtain a positive result with a rational physical meaning because both T1 and T4 are read from the same clock, and because T4 is always later than T1, for example.

In order to calculate the propagation delay using (1) or (2), all the time stamps from T1 to T4 must be used. Thus, depending on whether UAV controller 610, UAV 630, or both are configured to calculate the propagation delay, time stamps T1 and T4 or T2 and T3 may need to be communicated across wireless link 620 to an appropriate device (e.g., time stamps T2 and T3 to UAV controller 610, and/or time stamps T1 and T4 to UAV 630).

Figure 8:
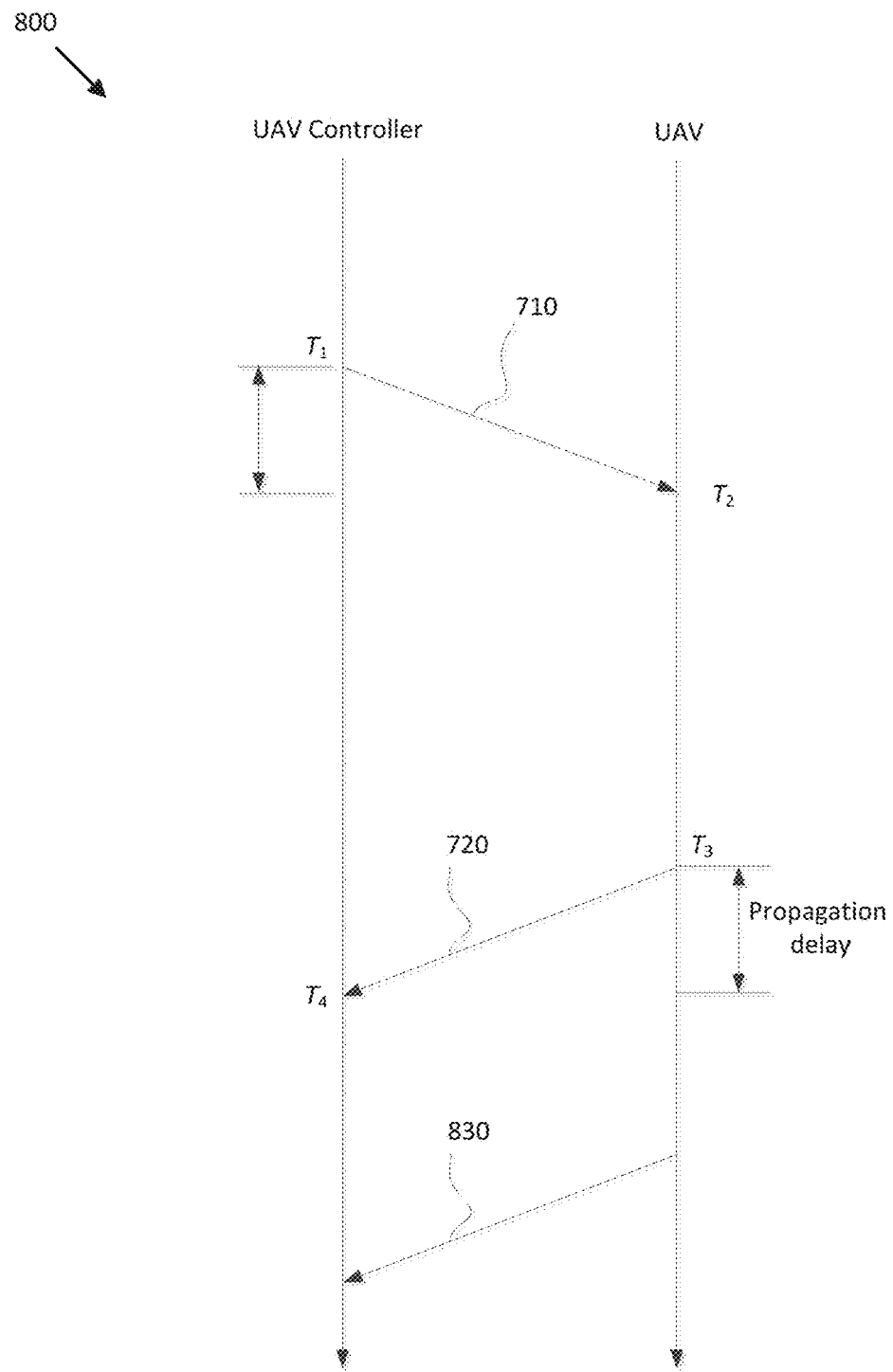

In one embodiment, only UAV controller 610 is configured to calculate the propagation delay for control proposes. Typically, time stamp T2 is known before the transmission of timing measuring packet 720 and so T2 can be included in timing measuring packet 720. With a very elaborate ideal design, time stamp T3 may be known before the actual transmission of timing measurement packet 720 and included in timing measurement packet 720 accordingly. However, in typical practice, time stamp T3 is known only after timing measurement packet 720 is transmitted in order to simplify the system design. FIG. 8 illustrates a timing diagram 800 for propagation delay measurement in UAV system 600 in accordance with an embodiment of the disclosure. FIG. 8 shows an additional packet 830 used to transmit time stamp T3 from UAV 630 to UAV controller 610. In both FIGS. 7 and 8, packet 720 can be considered as acknowledgement for packet 710. The last packet of 720 in FIGS. 7 and 830 in FIG. 8 may require further acknowledgement.

Figure 9:
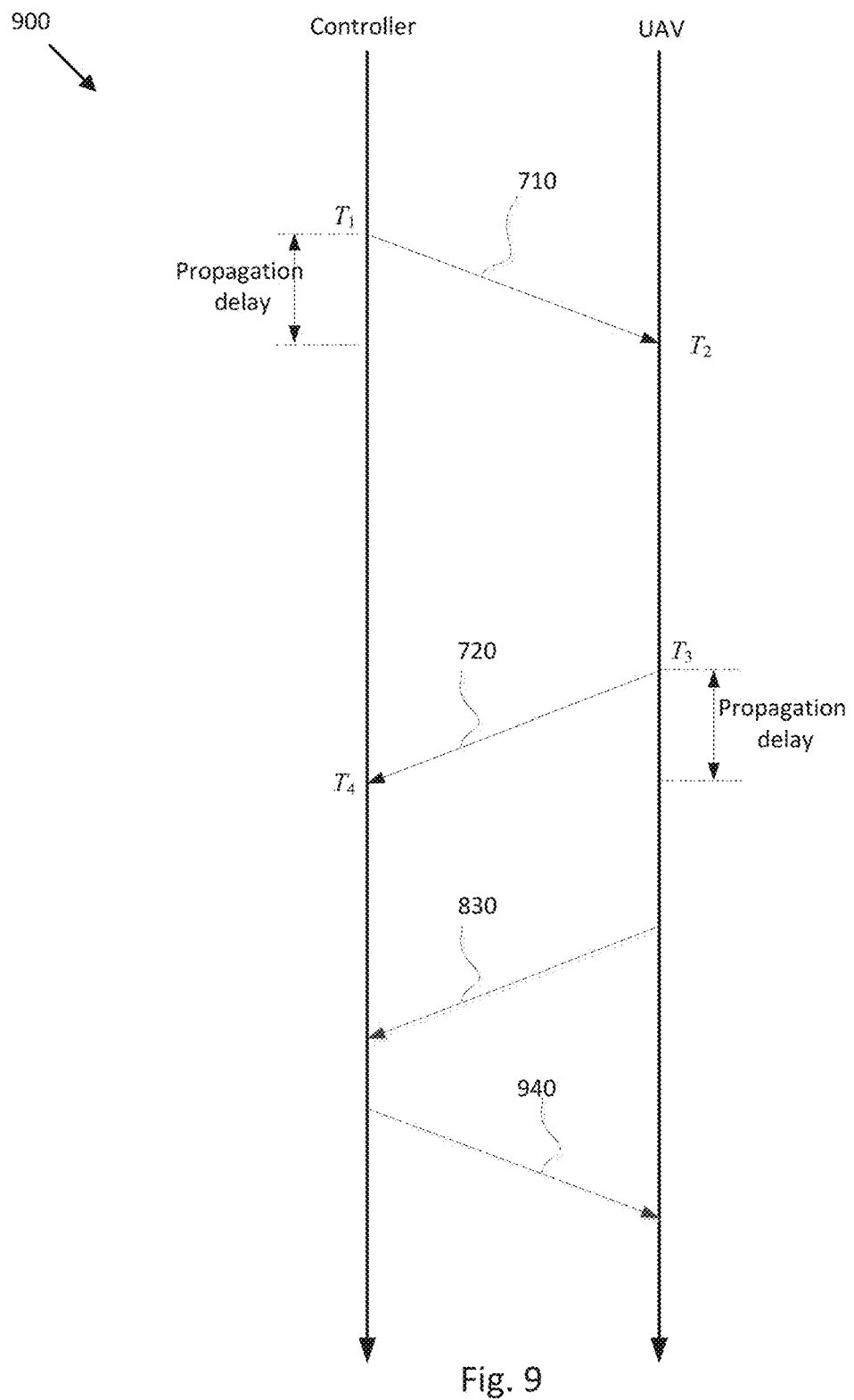

In another embodiment, both UAV controller 610 and UAV 630 are configured to obtain the propagation delay. FIG. 9 illustrates a timing diagram 900 for propagation delay measurement in UAV system 600 in accordance with an embodiment of the disclosure. As shown in FIG. 9, an additional timing measurement packet 940, carrying the information of T1, T4, and the propagation delay if available, is transmitted by UAV controller 610 as the acknowledgement of the timing measurement packet 830. While UAV controller 610 calculates the propagation delay after it receives timing measurement packet 830, UAV 630 can either calculate the propagation delay using (1) or (2) after obtaining T1 and T4 from timing measurement packet 940, or retrieve the propagation delay calculated by UAV controller 610 directly from timing measurement packet 940. Timing measurement packet 940 may require further acknowledgement.

In various embodiments, the propagation delay measurement process can be performed on-demand, for example triggered by user instructions input into UAV controller 610. In embodiments where UAV 630 initiates the propagation delay measurement, UAV 630 may be configured to first send a signal to UAV controller 610, and then UAV controller 610 may be configured to start a timing measurement according to FIG. 9.

Figure 10:
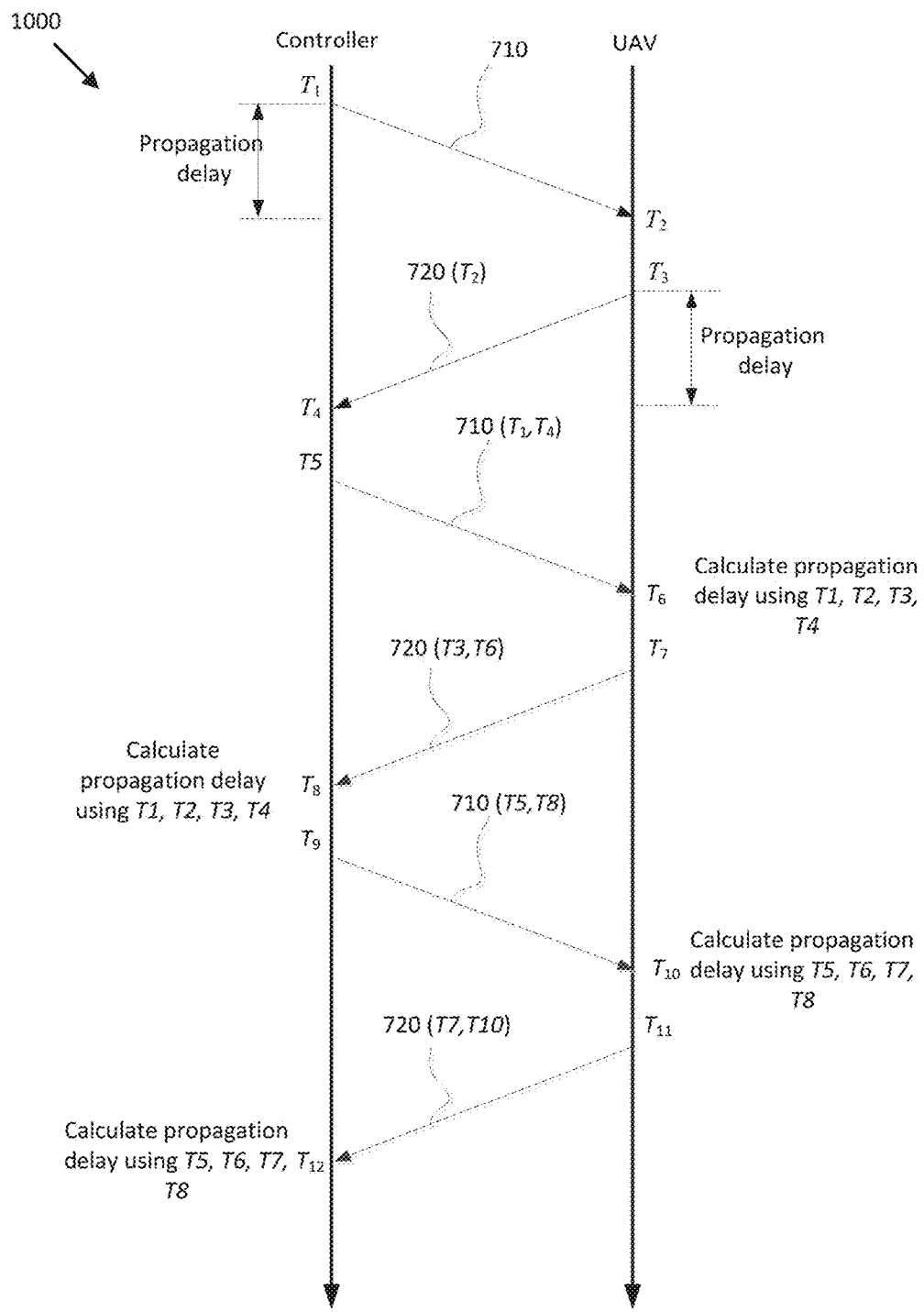

The propagation delay measurement process between UAV controller 610 and UAV 630 can also be performed regularly at a given or predefined time interval. In such embodiments, because timing measurement packets 710 and 720 are sent and received periodically, they can serve the function of timing measurement packets 830 and 940 as well. FIG. 10 illustrates a timing diagram 1000 for propagation delay measurement in UAV system 600 in accordance with an embodiment of the disclosure, and in particular, FIG. 10 shows a periodic propagation delay measurement process. Specifically, timing measurement packet 710 carries the transmitting time stamp of the previous timing measurement packet 710 and the receiving time stamp of the previous timing measurement packet 720, and timing measurement packet 720 carries the receiving time stamp of the previous timing measurement packet 710, as well as the transmitting time stamp of the previous timing measurement packet 720, as shown. UAV controller 610 and UAV 630 can calculate the propagation delay once they obtain all four time stamps for a timing measurement packet 710 and the consequent packet 720. In FIG. 10, all packets in the same direction 710, for example, serve the same purpose but carry different time stamp values, as shown. Such process thereby provides a constantly updating range measurement corresponding to the measured propagation delay.

Power Measurement

In various embodiments, the receivers of both UAV 630 and UAV controller 610 can be configured to constantly measure the power of received signals. For example, in some embodiments, UAV system 600 may be configured to use adaptive modulation and rate adaptation (e.g., to change the data rate) to maintain or increase link quality. If the received signal becomes relatively weak, UAV controller 610 or UAV 630 may be configured to implement more robust modulation so as to require less power to achieve a certain link quality. Power measurements may be used to drive adaptive modulation if the measured received power is communicated back from a receiving device (e.g., UAV 630) to a transmitting device (e.g., UAV controller 610). For example, UAV 630 may detect a reduction in the received power of transmissions from UAV controller 610 over wireless link 620 and transmit an indication of the reduced power (e.g., in the form of a transmission packet) to UAV controller 610. UAV controller 610 may be configured to receive such transmission packet and adaptively adjust a modulation of wireless link 620 to increase link quality while experiencing the detected reduction in received power. Alternatively, a receiving device may send an instruction to a transmitting device to increase or decrease the transmitting device's transmission data rate to conform to a particular link quality or power.

In additional to rate adaptation, power measurements can be used to determine whether there is a blockage in the wireless link, such as a degradation in link quality related to reflections by a building, mountain, or other structure, where the wireless link can often maintain communication capability but typically with far less received power. By performing a power measurement to detect such loss in received power, UAV 630 and/or UAV controller 610 can determine whether the wireless link state of wireless link 620 between them corresponds to a line-of-sight (LOS) link state or non-line-of-sight (NLOS) link state. This can be particularly helpful when attempting to adhere to FAA regulations that require LOS conditions when piloting a UAV. As described herein, power measurements, which can be communicated between UAV controller 610 and UAV 630 using the same or similar packet structures and timings as shown in FIGS. 7-10, can be used to determine the moment of transition between LOS and NLOS by indicating power transients or abrupt power loss or gain in transmissions over wireless link 620. For example, UAC controller 610 or UAV 630 may be configured to monitor power measurements of either device, communicated over wireless link 620, and detect transitions between LOS and NLOS as transitions In 802.11 or similar wireless standards, the measured power may be referred to as the received signal strength indicator (RSSI). A change in RSSI can be used to determine the moment of LOS to NLOS transition and/or the moment of NLOS to LOS transition. In some embodiments, the RSSI measurement may not be effective if the packet is received correctly to rule out the case in which a change in RSSI is actually due to huge signal interference in the wireless link.

Antenna Array

Wireless link 620 may be formed using a transmitter array and a receiver array (e.g., similar to transmitter array 124 and receiver array 128), especially for 60 GHz millimeter wave systems that often require antenna arrays to compensate for the typically relatively large channel propagation losses due to the bands short wavelengths. As noted herein, one or both of the antenna arrays forming wireless link 620 may be implemented as an antenna array comprising a single antenna element (e.g., a single element antenna array) as necessary according to one or more of the various methods described herein.

Figure 11:
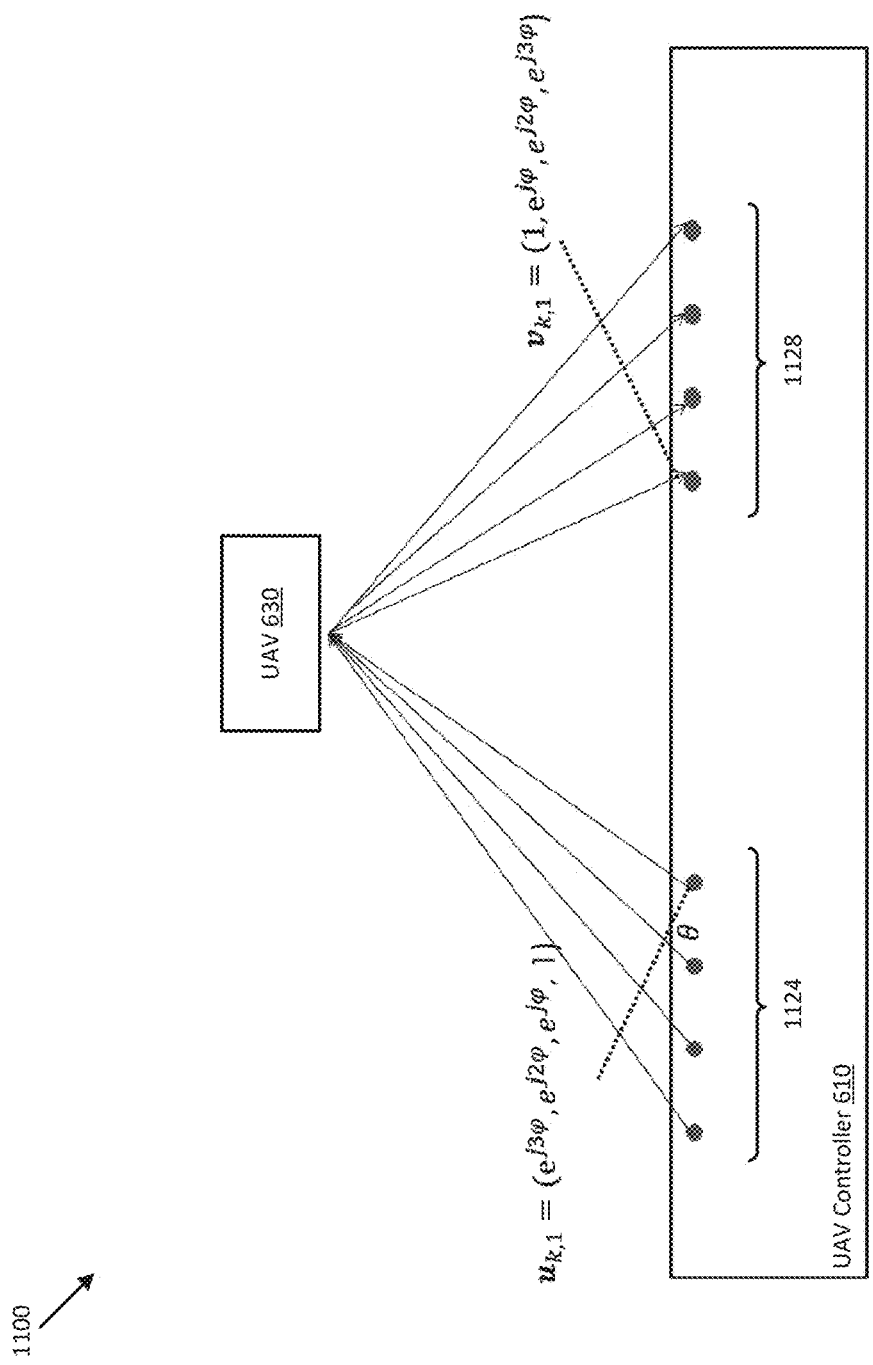
FIG. 11 illustrates a diagram of angles of departure and arrival with respect to an unmanned aerial vehicle system in accordance with an embodiment of the disclosure.

FIG. 11 illustrates a diagram of angles of departure and arrival with respect to transmitter and receiver antenna arrays for an unmanned aerial vehicle system in accordance with an embodiment of the disclosure. Using linear transmitter antenna array 1124 and linear receiver antenna array 1128 as examples, FIG. 11 illustrates that different antenna elements experience signals having different phase shifts depending on the angle of arrival or angle of departure (e.g., corresponding to directional vectors between UAV controller 610 and UAV 630). Because determining the angle of arrival is the same problem as determining the angle of departure, the angle of departure is used for explanation purposes, but similar methods may also be applicable to angle of arrival. In practice, with substantially co-located transmit and receive antennas (e.g., the spacing between antenna elements and/or antenna arrays is relatively small), the angle of arrival and angle of departure are substantially the same. For illustration purposes, FIG. 11 shows differences in the angles of departure and arrival. Although FIG. 11 just shows a linear array, a two-dimensional array would allow both elevation and azimuthal angle of either arrival or departure to be determined.

Assuming an angle of departure of θ and antenna separation of Δ, the path difference between different antennas is equal to $\Delta \sin\theta$ with the corresponding phase difference equal to $$\varphi = \frac{2\pi}{\lambda}\Delta\sin\theta, \qquad (13)$$

where λ is the wavelength of the wireless signal in air.

The phase difference of φ may be measured according to various different methods. In one embodiment, the phase difference φ may be given by the angle of the complex amplitude weight vector (AWV) of the antenna array. The AWV may be given by a beamforming process in which the beam from the transmitter device (e.g., UAV controller 610) points towards the receiver device (e.g., UAV 630), and the beam of the receiver device points towards the transmitter device. This pointing process is implemented as a coherent adding of the signals among different antennas. With this coherently addition of signals, the signal from certain angles (toward the receiver) of the transmit array is enhanced while other angles are suppressed, as is typical with beamforming antenna arrays. Ideally, the AWV should compensate for the phase difference among different antennas, or, put differently, the phase of the AWV is the complement of that of the phase difference given by (13). Without physically moving the antenna arrays, the beam of the transmitter may point toward the angle of departure and the beam of the receiver may point toward the angle of arrival. In this specific scheme, the phase difference (13) is the complement of the phase of the AWV.

In another embodiment and especially for angles of arrival, the phase difference may be measured by the analog-to-digital samples of the corresponding received signals of the antennas. The received signals from different antennas may correlate with each other, up to a time delay/phase, and the correlation and time delay between those signals can be used to determine the angles of arrival accordingly, as described herein. There are many different algorithms that may be used to obtain the angle of arrival and angle of departure, such as any of those disclosed herein, including MUSIC and ESPRIT. In embodiments similar to FIG. 6, where only a single angle needs to be identified, a simple algorithm may be available, and multiple angles can be used to identify whether the system is in NLOS condition.

Although the present discussion primarily discusses UAV controller 610, the angles of arrival and departure/directional vectors can also be measured with respect to UAV 630. The measurement may or may not be sent back to UAV controller 610 for further processing. In one embodiment, because UAV 630 may be moved and tilted and/or rotated relative to UAV controller 610, the angles of arrival and departure may take into account the orientation of UAV 630. In another embodiment, UAV 630 may be configured to pilot itself parallel to the ground by its own control and/or rotate with respect to UAV controller 610. In various embodiments, the angles of arrival and departure may indicate the elevation angle but ignore the azimuthal angle if the azimuthal angle due to rotation is not known to UAV 630. In practice, the azimuthal angle of UAV 630 can be measured with respect to UAV controller 610 and used to control UAV 630 to orient to selected orientations relative to UAV controller 610 and/or an antenna array of UAV controller 610.

In various embodiments, the angles of arrival and departure/direction vectors between UAV controller 610 and UAV 630 may be used: for UAV controller 610, to determine the relative position of UAV 630 with respect to UAV controller 610 (e.g., together with the range, the exact location in three dimensional space may be determined); using a time series of measurements, to determine the relative speed/velocity of UAV 630; when the time series of measurements include a relatively large change in value across adjacent or semi-adjacent measurements in the time series, to detect a transition in link state between LOS and NLOS (e.g., LOS to NLOS or NLOS to LOS); for UAV 630, to detect and control the orientation of UAV 630 with respect to UAV controller 610; when the measured angles of UAV 630 are transmitted back to UAV controller 610, to implement a method to detect that the wireless link suffers from detrimental multipath propagation (e.g., reflections) in an NLOS link state (e.g., when the measured angles/direction vectors are not the same/opposite for UAV controller 610 and UAV 630 when the antenna arrays for both UAV controller 610 and UAV 630 are parallel to the ground, for example).

Figure 12:
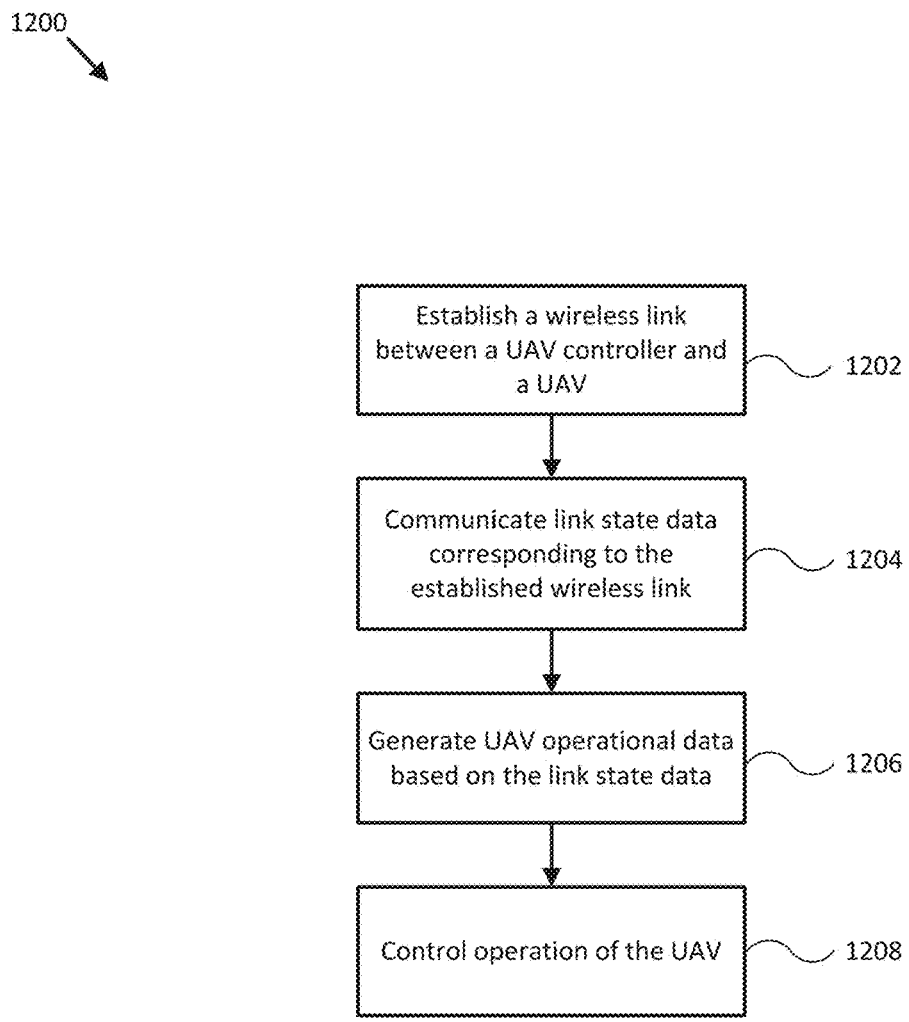
FIG. 12 illustrates a process to operate an unmanned aerial vehicle system in accordance with an embodiment of the disclosure.

FIG. 12 illustrates a process 1200 to operate unmanned aerial vehicle system 600 in accordance with an embodiment of the disclosure. In some embodiments, the operations of FIG. 12 may be implemented as software instructions executed by one or more logic devices associated with corresponding electronic devices, sensors, and/or structures depicted in FIGS. 1 through 2E and 6-11. More generally, the operations of FIG. 12 may be implemented with any combination of software instructions and/or electronic hardware (e.g., inductors, capacitors, amplifiers, actuators, or other analog and/or digital components). It should be appreciated that any step, sub-step, sub-process, or block of processes 1200 may be performed in an order or arrangement different from the embodiments illustrated by FIG. 12. For example, in other embodiments, one or more blocks may be omitted from process 1200, and other blocks may be included. Furthermore, block inputs, block outputs, various sensor signals, sensor information, calibration parameters, and/or other operational parameters may be stored to one or more memories prior to moving to a following portion of process 1200. Although process 1200 is described with reference to systems 110 and 600 and FIGS. 1-2E and 6-11, process 1200 may be performed by other systems different from systems 110 and 600 and including a different selection of electronic devices, sensors, assemblies, and/or antenna arrangements. At the initiation of process 1200, various system parameters may be populated by prior execution of a process similar to process 1200, for example, or may be initialized to zero and/or one or more values corresponding to typical, stored, and/or learned values derived from past operation of process 1200, as described herein.

In block 1202, a logic device establishes a wireless link between a UAV controller and a UAV. For example, a controller (e.g., similar to controller 112 and/or co-controller 120 of system 110) of UAV controller 610 or UAV 630 may be configured to establish wireless link 620 between UAV controller 610 and UAV 630 using at least one transmitter antenna array and/or at least one receiver antenna array (e.g., similar to transmitter array 124 and receiver array 128 of system 110). UAV controller 610 establishing link 620 may include UAV controller 610 initiating or requesting a wireless link with UAV 630 and/or performing a negotiation and/or confirmation protocol (e.g., handshake) to pair with UAV 630 or otherwise establish wireless link 620 specifically to UAV 630. UAV 630 establishing link 620 may include UAV 630 initiating or requesting a wireless link with UAV controller 610 and/or performing a negotiation and/or confirmation protocol (e.g., handshake) to pair with UAV controller 610 or otherwise establish wireless link 620 specifically to UAV controller 610. In some embodiments, the controller may be configured to beamform wireless link 620 by determining an AWV to apply to a corresponding transmitter array or receiver array to establish wireless link 620 between UAV controller 610 and UAV 630.

In block 1204, a logic device communicates link state data corresponding to an established wireless link. For example, after wireless link 620 is established, a controller of UAV controller 610 or UAV 630 may be configured to transmit and/or receive link state data corresponding to wireless link 620 over wireless link 620. In some embodiments, the link state data may include a plurality of time stamps corresponding to transmissions and receptions of at least two timing measurement packets 710 and 720, a first one transmitted from UAV controller 610 to UAV 630 and a second one received by UAV controller 610 from UAV 630. The controller may be configured to determine a propagation delay associated with wireless link 620 from the plurality of time stamps and determine a range/distance between UAV controller 610 and UAV 630 based on the propagation delay. The controller may also be configured to determine a time series of propagation delays associated with wireless link 620 from the plurality of time stamps, detect a change in the time series of propagation delays indicating a transition in a link state of wireless link 620 between a LOS link state and a NLOS link state, and notify a user of UAV controller 610 of the transition in the link state, such as by visual notification on a display of UAV controller 610, or as by an audible notification generated by a speaker/transducer of UAV controller 610. Such change may include a relatively abrupt or discontinuous change in the time series of propagation delays, such as a greater than 10% change in a single time step, for example.

In block 1206, a logic device generates UAV operational data based on link state data. For example, a controller of UAV controller 610 or UAV 630 may be configured to generate UAV operational data based, at least in part, on the link state data communicated in block 1204, where the UAV operational data is configured to control operation of UAV 630. For example, the link state data may be used, by a controller of UAV controller 610 or UAV 630, to generate UAV operational data to pilot UAV 630 according to an orientation, position, and/or speed relative to UAV controller 610 and/or wireless link 620 as indicated by the link state data, to pilot UAV 630 to correct safety or regulatory excursions as indicated by the link state data, to orient cameras and/or other sensors on UAV 630 relative to UAV controller 610 and/or wireless link 620 as indicated by the link state data, and/or to otherwise help operate UAV 630 according to a desired application.

In some embodiments, if the link state data indicates a transition in a link state of wireless link 620 from a line-of-sight link state to a non-line-of-sight link state, a controller of UAV 630 may be configured to generate UAV operational data to cause UAV 630 to enter a hover mode to maintain its altitude and position while awaiting further link state data indicating a transition back to a LOS link state, for example. In other embodiments, the controller of UAV 630 may be configured to generate UAV operational data to cause UAV 630 to retrace its flight path in reverse to re-establish a LOS link state, enter a return-to-home mode (e.g., where UAV 630 is autopiloted to increase altitude to a predetermined height, to translate position at the predetermined height and hover over a predetermined "home" position substantially adjacent UAV controller 610, and to land), and/or perform other flight operations configured to re-establish a LOS link state or safely pilot or land UAV 630. In further embodiments, the controller of UAV 630 may be configured to adjust a transmit and/or receive power, signal modulation, or data rate to increase a link quality of wireless link 620 configured to re-establish a LOS link state, or transmit such adjustments as UAV operational data to UAV controller 610, which may be configured to implement similar measures. Upon re-establishing a LOS link state, UAV 630 may be configured to resume piloting as controlled by operational data and/or controller data provided by UAV controller 610.

Under similar circumstances, a controller of UAV controller 610 may be configured to generate UAV operational data to cause UAV controller 610 to notify a user of UAV controller 610 of the transition in the link state (e.g., by visual or audible indicator). The controller of UAV controller 610 may alternatively and/or additionally be configured to adjust a transmit and/or receive power, signal modulation, or data rate to increase a link quality of wireless link 620 and re-establish a LOS link state, or to transmit such adjustments as UAV operational data to UAV 630, which may be configured to implement similar measures. In related embodiments, the controller of UAV controller 610 may be configured to transmit UAV operational data and/or adjusted UAV controller data (e.g., adjusted from direct user input/control, preplanned autopilot control, and/or other unadjusted UAV controller data) configured to cause UAV 630 to enter a hover mode, a return-to-home mode, a retrace-flight-path mode, and/or to perform other flight operations configured to re-establish a LOS link state or safely pilot or land UAV 630. Upon receiving/determining link state data indicating a transition in a link state of wireless link 620 from a NLOS link state to a LOS link state, the controller of UAV controller 610 may be configured to notify a user of UAV controller 610 of the transition in the link state and/or to resume transmitting UAV operational data and/or unadjusted UAV controller data.

In other embodiments, a controller of UAV controller 610 or UAV 630 may be configured to detect UAV 630 exceeding a predefined (e.g., by the parent of a user) safety limitation on the speed and/or altitude of UAV 630, for example, and/or other regulatory speed, position (e.g., airport/light path restrictions), and/or altitude limitations, from the link state data, and adjust UAV operational data before it is used to control operation of UAV 630 (e.g., generate alternative UAV operational data) to perform one or more various flight operations configured to adhere to the safety and/or regulatory limitations. For example, a controller of UAV controller 610 or UAV 630 may be configured to generate UAV operational data to limit upward vertical velocity when nearing an altitude limit, to cause UAV 630 to drop below an altitude limit, and/or to enter a return-to-home mode if any predefined limits are exceeded during operation of UAV 630.

In some embodiments, the link state data may include a time series of a plurality of power measurements corresponding to receptions of the link state data in block 1204 and/or the UAV operational data in block 1206 by UAV controller 610 or UAV 630 over wireless link 620. For example, the controller may be configured to measure the power of received transmissions of link state data and/or operational data. The controller may be configured to detect a change in link gain of wireless link 620 in the time series of power measurements and adjust a modulation of the wireless link and/or increase or decrease a transmission data rate according to the detected change in link gain, as appropriate. In some embodiments, the controller may be configured to detect a change in link gain of wireless link 620 in the time series of power measurements indicating a transition in a link state of wireless link 620 between a line-of-sight link state and a non-line-of-sight link state, and to notify a user of UAV controller 610 of the transition in the link state. Such change may include a relatively abrupt or discontinuous change in the time series of power measurements, such as a greater than 10% change in a single time step, for example.

In some embodiments, the controller may be configured to determine a directional vector between UAV controller 610 and UAV 630 (e.g., an AoA or AoD) from the transmitting and/or receiving link state data in block 1204 and/or UAV operational data in block 1206 over wireless link 620, determine a position of UAV 630 relative to UAV controller 610 from the range and the directional vector, and indicate the position on a display of UAV controller 610 to a user of UAV controller 610. In further embodiments, the controller may be mounted within UAV controller 610 and be configured to determine a time series of propagation delays associated with wireless link 620 from the plurality of time stamps and a corresponding time series of ranges between UAV controller 610 and UAV 630 based on the time series of propagation delays, determine a time series of directional vectors between UAV controller 610 and UAV 630 from the transmitting and/or receiving link state data and/or UAV operational data over wireless link 620, determine a time series of positions of UAV 630 relative to UAV controller 610 from the time series of ranges and the time series of directional vectors, determine a velocity of UAV 630 relative to UAV controller 610 from the time series of positions, and indicate the velocity of UAV 630 on a display of UAV controller 610 to a user of UAV controller 610.

In additional embodiments, the controller may be configured to determine a time series of directional vectors between UAV controller 610 and UAV 630 from the transmitting and/or receiving link state data in block 1204 and/or UAV operational data in block 1206 over the established wireless link, detect a change in the time series of directional vectors indicating a transition in a link state of wireless link 610 between a line-of-sight link state and a non-line-of-sight link state, and notify a user of UAV controller 610 of the transition in the link state. Such change may include a relatively abrupt or discontinuous change in the time series of directional vectors, such as a greater than 10% change in direction over a single time step, for example. In one embodiment, the controller may be mounted to UAV 630 and be configured to determine a directional vector between UAV controller 610 and UAV 630 from the transmitting and/or receiving link state data in block 1204 and/or UAV operational data in block 1206 over wireless link 610, and to pilot UAV 630 to maintain or adjust an orientation of UAV 630 relative to UAV controller 610 using the directional vector as a reference. For example, UAV 630 may be configured to pilot itself so as to aim a mounted camera at UAV controller 610 regardless of a flight path for UAV 630.

The controller may also be configured to determine, from the transmitting and/or receiving the link state data and/or the UAV operational data over wireless link 620 in blocks 1204 and 1206, a first directional vector from UAV controller 610 to UAV 630 and a second directional vector from UAV 630 to UAV controller 610, detect a transition in a link state of wireless link 610 from a line-of-sight link state to a non-line-of-sight link state, and determine the non-line-of-sight link state is due to detrimental multipath propagation based, at least in part, on the first and second directional vectors. For example, if the first and second directional vectors are not parallel, then one of the two devices is likely measuring a reflected beam, which may be causing a decrease in the link gain of wireless link 620. In various embodiments, at least one of the first and second directional vectors may be determined by measuring a phase difference between adjacent antenna elements in a transmitter antenna array or a receiver antenna array in UAV controller 610 and/or UAV 630. Upon such determination, a controller of UAV 630 or of UAV controller 610 may be configured to adjust a modulation, data rate, or other beam or channel characteristic of wireless link 620 (e.g., and/or to transmit such adjustments as adjusted UAV operational data over wireless link 620) to help compensate for the detrimental multipath propagation, such as where changing a spatial position or orientation of UAB 630 is insufficient to re-establish a LOS link state. Alternatively, or in addition, at least one of the first and second directional vectors may be determined based on an antenna weight vector applied to the transmitter antenna array or the receiver antenna array to establish wireless link 620 between UAV controller 610 and UAV 630 in block 1202.

In block 1208, a logic device controls operation of a UAV. For example, a controller of UAV controller 610 may be configured to transmit UAV control data and/or operational data over wireless link 620, where the UAV control data and/or operational data is configured to control operation of UAV 630. In some embodiments, a controller of UAV 630 may be configured to receive UAV control data and/or UAV operation data over wireless link 620 and use the data to control operation of UAV 630. In various embodiments, at least a portion of the UAV operational data may be adjusted based, at least in part, on the link state data communicated in block 1204, before being used to control operation of UAV 630. For example, the link state data may be used, by a controller of UAV controller 610 or UAV 630, to adjust the UAV operational data (before or after communication over wireless link 620) to pilot UAV 630 according to an orientation, position, and/or speed relative to UAV controller 610 and/or wireless link 620 as indicated by the link state data, to pilot UAV 630 to correct safety or regulatory excursions as indicated by the link state data, to orient cameras and/or other sensors on UAV 630 relative to UAV controller 610 and/or wireless link 620 as indicated by the link state data, and/or to otherwise help operate UAV 630 according to a desired application.

In some embodiments, a controller of UAB 630 may be configured to receive UAV controller data and link state data from UAV controller 610 over wireless link 610 and to generate the UAV operational data based, at least in part, on the link state data and the UAV controller data received over wireless link 620 from UAV controller 610. In other embodiments, a controller of UAV controller 610 may be configured to transmit generated UAV operational data to UAV 610 over wireless link 620. In various embodiments, a controller of UAV controller 610 or UAV 630 may be configured to adjust UAV operational data generated by UAV controller 610 or UAV 630 based, at least in part, on the link state data, before controlling operation of UAV 630 using the UAV operational data.

In some embodiments, a method of operating a UAV system includes establishing a wireless link between an unmanned aerial vehicle (UAV) controller and a UAV using at least one transmitter antenna array and at least one receiver antenna array; communicating link state data corresponding to the established wireless link over the established wireless link; and communicating UAV operational data over the established wireless link, wherein the UAV operational data is configured to control operation of the UAV, and wherein at least a portion of the UAV operational data is adjusted based, at least in part, on the link state data before the UAV operational data is used to control operation of the UAV. In other embodiments, the method may include establishing a wireless link between an unmanned aerial vehicle (UAV) controller and a UAV using a transmitter antenna array; communicating link state data corresponding to the established wireless link over the established wireless link; generating UAV operation data based at least in part on the on the link state data, to control operation of the UAV; and communicating the UAV operational data over the established wireless link.

In related embodiments, the link state data comprises a plurality of time stamps corresponding to transmissions and receptions of at least two timing measurement packets, a first one transmitted from the UAV controller to the UAV and a second one received by the UAV controller from the UAV, and the method includes determining a propagation delay associated with the established wireless link from the plurality of time stamps; and determining a range between the UAV controller and the UAV based on the propagation delay. The method may also include determining a directional vector between the UAV controller and the UAV from the communicating the link state data and/or the UAV operational data over the established wireless link; determining a position of the UAV relative to the UAV controller from the range and the directional vector; and indicating the position on a display of the UAV controller to a user of the UAV controller. The method may also include determining a time series of propagation delays associated with the established wireless link from the plurality of time stamps; detecting a change in the time series of propagation delays indicating a transition in a link state of the established wireless link from a line-of-sight link state to a non-line-of-sight link state; and adjusting the UAV operational data to cause the UAV to perform flight operations to re-establish the line-of-sight link state.

The method may also include determining a time series of propagation delays associated with the established wireless link from the plurality of time stamps and a corresponding time series of ranges between the UAV controller and the UAV based on the time series of propagation delays; determining a time series of directional vectors between the UAV controller and the UAV from the transmitting and/or receiving link state data and/or UAV operational data over the established wireless link; determining a time series of positions of the UAV relative to the UAV controller from the time series of ranges and the time series of directional vectors; determining a velocity of the UAV relative to the UAV controller from the time series of positions; and indicating the velocity of the UAV on a display of the UAV controller to a user of the UAV controller.

In some embodiments, the link state data comprises a time series of a plurality of power measurements corresponding to receptions of the link state data and/or the UAV operational data by the UAV controller or the UAV over the established wireless link, and the method may include detecting a change in link gain of the established wireless link in the time series of power measurements; and adjusting a modulation of the wireless link and/or increasing or decreasing a transmission data rate according to the detected change in link gain. Similarly, the link state data max include a time series of a plurality of power measurements corresponding to receptions of the link state data and/or the UAV operational data by the UAV controller or the UAV over the established wireless link, and the method may include detecting a change in link gain of the established wireless link in the time series of power measurements indicating a transition in a link state of the established wireless link between a line-of-sight link state and a non-line-of-sight link state; and notifying a user of the UAV controller of the transition in the link state.

In further embodiments, the method may include determining a time series of directional vectors between the UAV controller and the UAV from the transmitting and/or receiving link state data and/or UAV operational data over the established wireless link; detecting a change in the time series of directional vectors indicating a transition in a link state of the established wireless link from a line-of-sight link state to a non-line-of-sight link state; and adjusting the UAV operational data to cause the UAV to perform flight operations to re-establish the line-of-sight link state. The method may also include determining a directional vector between the UAV controller and the UAV from the transmitting and/or receiving link state data and/or UAV operational data over the established wireless link; piloting the UAV to maintain or adjust an orientation of the UAV relative to the UAV controller using the directional vector as a reference.

In additional embodiments, the method may include determining, from the transmitting and/or receiving the link state data and/or UAV operational data over the established wireless link, a first directional vector from the UAV controller to the UAV and a second directional vector from the UAV to the UAV controller; detecting a transition in a link state of the established wireless link from a line-of-sight link state to a non-line-of-sight link state; and determining the non-line-of-sight link state is due to detrimental multi-path propagation based, at least in part, on the first and second directional vectors. At least one of the first and second directional vectors may be determined by measuring a phase difference between adjacent antenna elements in the transmitter antenna array or the receiver antenna array, and at least one of the first and second directional vectors may be determined based on an antenna weight vector applied to the transmitter antenna array or the receiver antenna array to establish the wireless link between the UAV controller and the UAV.

In various embodiments, a UAV system may include a transmitter coupled to a transmitter antenna array, wherein the transmitter is configured to apply amplitude weight vectors to signals provided to the transmitter antenna array to form corresponding transmitter channels using one or more antenna elements of the transmitter antenna array; a receiver coupled to a receiver antenna array, wherein the receiver is configured to apply amplitude weight vectors to signals provided to the receiver antenna array to form corresponding receiver channels using one or more antenna elements of the receiver antenna array; a controller configured to communicate with the transmitter and the receiver; and a memory configured to store a plurality of computer readable instructions which when executed by the controller are adapted to cause the system to perform a method comprising establishing a wireless link between an unmanned aerial vehicle (UAV) controller and a UAV using at least one of the transmitter antenna array and the receiver antenna array; communicating link state data corresponding to the established wireless link over the established wireless link; and communicating UAV operational data over the established wireless link, wherein the UAV operational data is configured to control operation of the UAV, and wherein at least a portion of the UAV operational data is adjusted based, at least in part, on the link state data before the UAV operational data is used to control operation of the UAV. In alternative embodiments, the method may include establishing a wireless link between an unmanned aerial vehicle (UAV) controller and a UAV using at least one of the transmitter antenna array and the receiver antenna array; communicating link state data corresponding to the established wireless link over the established wireless link; and communicating UAV operational data over the established wireless link to control operation of the UAV, wherein at least a portion of the UAV operational data is generated based, at least in part, on the link state data.

In some embodiments, the link state data comprises a plurality of time stamps corresponding to transmissions and receptions of at least two timing measurement packets, a first one transmitted from the UAV controller to the UAV and a second one received by the UAV controller from the UAV, and the method includes determining a propagation delay associated with the established wireless link from the plurality of time stamps; and determining a range between the UAV controller and the UAV based on the propagation delay. In related embodiments, the method may include determining a directional vector between the UAV controller and the UAV from the transmitting and/or receiving link state data and/or UAV operational data over the established wireless link; determining a position of the UAV relative to the UAV controller from the range and the directional vector; and indicating the position on a display of the UAV controller to a user of the UAV controller. The method may also include determining a time series of propagation delays associated with the established wireless link from the plurality of time stamps; detecting a change in the time series of propagation delays indicating a transition in a link state of the established wireless link between a line-of-sight link state and a non-line-of-sight link state; and notifying a user of the UAV controller of the transition in the link state.

In other embodiments, the controller may be mounted within the UAV controller, and the method includes determining a time series of propagation delays associated with the established wireless link from the plurality of time stamps and a corresponding time series of ranges between the UAV controller and the UAV based on the time series of propagation delays; determining a time series of directional vectors between the UAV controller and the UAV from the transmitting and/or receiving link state data and/or UAV operational data over the established wireless link; determining a time series of positions of the UAV relative to the UAV controller from the time series of ranges and the time series of directional vectors; determining a velocity of the UAV relative to the UAV controller from the time series of positions; and indicating the velocity of the UAV on a display of the UAV controller to a user of the UAV controller.

In embodiments where the link state data comprises a time series of a plurality of power measurements corresponding to receptions of the link state data and/or the UAV operational data by the UAV controller or the UAV over the established wireless link, the method may include detecting a change in link gain of the established wireless link in the time series of power measurements; and adjusting a modulation of the wireless link and/or increasing or decreasing a transmission data rate according to the detected change in link gain. In similar embodiments where the link state data comprises a time series of a plurality of power measurements corresponding to receptions of the link state data and/or the UAV operational data by the UAV controller or the UAV over the established wireless link, the method may also include detecting a change in link gain of the established wireless link in the time series of power measurements indicating a transition in a link state of the established wireless link from a line-of-sight link state to a non-line-of-sight link state; and adjusting the UAV operational data to cause the UAV to perform flight operations to re-establish the line-of-sight link state. The method may alternatively include detecting a change in link gain of the established wireless link in the time series of power measurements indicating a transition in a link state of the established wireless link from a LOS link state to a NLOS link state or from a NLOS link state to a LOS link state; and notifying a user of the UAV controller of the transition in the link state.

In some embodiments, the method includes determining a time series of directional vectors between the UAV controller and the UAV from the transmitting and/or receiving link state data and/or UAV operational data over the established wireless link; detecting a change in the time series of directional vectors indicating a transition in a link state of the established wireless link between a line-of-sight link state and a non-line-of-sight link state; and notifying a user of the UAV controller of the transition in the link state.

In further embodiments, the controller may be mounted to the UAV, and the method may include determining a directional vector between the UAV controller and the UAV from the transmitting and/or receiving link state data and/or UAV operational data over the established wireless link; and piloting the UAV to maintain or adjust an orientation of the UAV relative to the UAV controller using the directional vector as a reference. More generally, the method may also include determining, from the transmitting and/or receiving the link state data and/or the UAV operational data over the established wireless link, a first directional vector from the UAV controller to the UAV and a second directional vector from the UAV to the UAV controller; detecting a transition in a link state of the established wireless link from a line-of-sight link state to a non-line-of-sight link state; and determining the non-line-of-sight link state is due to detrimental multipath propagation based, at least in part, on the first and second directional vectors.

Various embodiments of the present disclosure include a non-transitory machine-readable medium storing a plurality of machine-readable instructions which when executed by one or more processors of a unmanned aerial vehicle (UAV) system are adapted to cause the UAV system to perform a computer-implemented method including establishing a wireless link between a UAV controller and a UAV using at least one transmitter antenna array and/or at least one receiver antenna array; communicating link state data corresponding to the established wireless link over the established wireless link; and communicating UAV operational data over the established wireless link, wherein the UAV operational data is configured to control operation of the UAV, and wherein at least a portion of the UAV operational data is adjusted based, at least in part, on the link state data before the UAV operational data is used to control operation of the UAV. In some embodiments, the computer-implemented method may include establishing a wireless link between a UAV controller and a UAV using at least one transmitter antenna array and/or at least one receiver antenna array; communicating link state data corresponding to the established wireless link over the established wireless link; and communicating UAV operational data over the established wireless link, wherein the UAV operational data is configured to control operation of the UAV, and wherein at least a portion of the UAV operational data is adjusted based, at least in part, on the link state data before the UAV operational data is used to control operation of the UAV.

In additional embodiments, a method of operating a UAV system may include establishing a beamformed wireless communication channel between an unmanned aerial vehicle (UAV) controller and a UAV; obtaining channel state information for the beamformed wireless communication channel; and determining an operation to be performed by the UAV using the channel state information. In some embodiments, the UAV controller comprises an antenna array with a plurality elements configured to form a beam directed towards the UAV, and the channel state information comprises one or more of angle of arrival and angle of departure information. The angle of arrival information may relate to angle of arrival of signals from the UAV at the UAV controller and the angle of departure information may relate to angle of departure of signals from the UAV controller to the UAV. In other embodiments, the UAV comprises an antenna array with a plurality elements configured to form a beam directed towards the UAV controller, and the channel state information comprises one or more of angle of arrival and angle of departure information. The method may include tracking, by the UAV, one or more of an azimuth and an elevation component of angle of arrival and orienting to a determined angle relative to the UAV controller. A further method may include determining, based at least on the link state data, a directional vector between the UAV controller and the UAV over a period of time; and detecting a transition in a link state of the established wireless link from a line-of-sight link state to a non-line-of-sight link state based on variation in the direction vector over the period of time.

Thus, embodiments of the present disclosure provide for weight and power efficient radar-like location detection in UAV systems that can also be used to detect changes in a link state of the wireless link for the UAV system indicative of unsafe flight.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
    establishing a wireless link between an unmanned aerial vehicle (UAV) controller and a UAV using at least one transmitter antenna array and at least one receiver antenna array;
    communicating link state data corresponding to the established wireless link over the established wireless link;
    generating UAV operational data based, at least in part, on the link state data, wherein the UAV operational data is configured to control operation of the UAV; and
    controlling operation of the UAV using the UAV operational data.

2. The method of claim 1, wherein the link state data comprises a plurality of time stamps corresponding to transmissions and receptions of at least two timing measurement packets, a first one transmitted from the UAV controller to the UAV and a second one received by the UAV controller from the UAV, the method further comprising:
    determining a propagation delay associated with the established wireless link from the plurality of time stamps; and
    determining a range between the UAV controller and the UAV based on the propagation delay.

3. The method of claim 2, further comprising:
    determining a directional vector between the UAV controller and the UAV from the communicating the link state data and/or communicating the UAV operational data over the established wireless link;
    determining a position of the UAV relative to the UAV controller from the range and the directional vector; and
    indicating the position on a display of the UAV controller to a user of the UAV controller.

4. The method of claim 2, further comprising:
    determining a time series of propagation delays associated with the established wireless link from the plurality of time stamps;
    detecting a change in the time series of propagation delays indicating a transition in a link state of the established wireless link from a line-of-sight link state to a non-line-of-sight link state; and
    generating the UAV operational data to cause the UAV to perform flight operations to re-establish the line-of-sight link state.

5. The method of claim 2, further comprising:
    determining a time series of propagation delays associated with the established wireless link from the plurality of time stamps and a corresponding time series of ranges between the UAV controller and the UAV based on the time series of propagation delays;
    determining a time series of directional vectors between the UAV controller and the UAV from the communicating the link state data and/or communicating the UAV operational data over the established wireless link;
    determining a time series of positions of the UAV relative to the UAV controller from the time series of ranges and the time series of directional vectors;
    determining a velocity of the UAV relative to the UAV controller from the time series of positions; and
    indicating the velocity of the UAV on a display of the UAV controller to a user of the UAV controller.

6. The method of claim 1, wherein the link state data comprises a time series of a plurality of power measurements corresponding to receptions of the link state data and/or the UAV operational data by the UAV controller or the UAV over the established wireless link, the method further comprising:
    detecting a change in link gain of the established wireless link in the time series of power measurements; and
    adjusting a modulation of the wireless link and/or increasing or decreasing a transmission data rate according to the detected change in link gain.

7. The method of claim 1, wherein the link state data comprises a time series of a plurality of power measurements corresponding to receptions of the link state data and/or the UAV operational data by the UAV controller or the UAV over the established wireless link, the method further comprising:
    detecting a change in link gain of the established wireless link in the time series of power measurements indicating a transition in a link state of the established wireless link between a line-of-sight link state and a non-line-of-sight link state; and
    notifying a user of the UAV controller of the transition in the link state.

8. The method of claim 1, further comprising:
    determining a time series of directional vectors between the UAV controller and the UAV from the communicating the link state data and/or communicating the UAV operational data over the established wireless link;
    detecting a change in the time series of directional vectors indicating a transition in a link state of the established wireless link from a line-of-sight link state to a non-line-of-sight link state; and generating the UAV operational data to cause the UAV to perform flight operations to re-establish the line-of-sight link state.

9. The method of claim 1, further comprising:
determining a directional vector between the UAV controller and the UAV from the communicating the link state data and/or communicating the UAV operational data over the established wireless link;
piloting the UAV to maintain or adjust an orientation of the UAV relative to the UAV controller using the directional vector as a reference.

10. The method of claim 1, further comprising:
determining, from the communicating the link state data and/or communicating the UAV operational data over the established wireless link, a first directional vector from the UAV controller to the UAV and a second directional vector from the UAV to the UAV controller;
detecting a transition in a link state of the established wireless link from a line-of-sight link state to a non-line-of-sight link state; and
determining the non-line-of-sight link state is due to detrimental multipath propagation based, at least in part, on the first and second directional vectors.

11. The method of claim 10, wherein:
at least one of the first and second directional vectors is determined by measuring a phase difference between adjacent antenna elements in the transmitter antenna array or the receiver antenna array.

12. The method of claim 10, wherein:
at least one of the first and second directional vectors is determined based on an antenna weight vector applied to the transmitter antenna array or the receiver antenna array to establish the wireless link between the UAV controller and the UAV.

13. A system comprising:
a transmitter coupled to a transmitter antenna array, wherein the transmitter is configured to apply amplitude weight vectors to signals provided to the transmitter antenna array to form corresponding transmitter channels using one or more antenna elements of the transmitter antenna array;
a receiver coupled to a receiver antenna array, wherein the receiver is configured to apply amplitude weight vectors to signals provided to the receiver antenna array to form corresponding receiver channels using one or more antenna elements of the receiver antenna array;
a logic device configured to communicate with the transmitter and the receiver; and
a memory configured to store a plurality of computer readable instructions which when executed by the logic device are adapted to cause the system to perform a method comprising:
establishing a wireless link between an unmanned aerial vehicle (UAV) controller and a UAV using at least one of the transmitter antenna array and the receiver antenna array;
communicating link state data corresponding to the established wireless link over the established wireless link;
generating UAV operational data based, at least in part, on the link state data, wherein the UAV operational data is configured to control operation of the UAV; and
controlling operation of the UAV using the UAV operational data.

14. The system of claim 13, wherein the link state data comprises a plurality of time stamps corresponding to transmissions and receptions of at least two timing measurement packets, a first one transmitted from the UAV controller to the UAV and a second one received by the UAV controller from the UAV, the method further comprising:
determining a propagation delay associated with the established wireless link from the plurality of time stamps; and
determining a range between the UAV controller and the UAV based on the propagation delay.

15. The system of claim 14, the method further comprising:
determining a directional vector between the UAV controller and the UAV from the communicating the link state data and/or communicating the UAV operational data over the established wireless link;
determining a position of the UAV relative to the UAV controller from the range and the directional vector; and
indicating the position on a display of the UAV controller to a user of the UAV controller.

16. The system of claim 14, the method further comprising:
determining a time series of propagation delays associated with the established wireless link from the plurality of time stamps;
detecting a change in the time series of propagation delays indicating a transition in a link state of the established wireless link between a line-of-sight link state and a non-line-of-sight link state; and
notifying a user of the UAV controller of the transition in the link state.

17. The system of claim 14, wherein the logic device is mounted within the UAV controller, the method further comprising:
determining a time series of propagation delays associated with the established wireless link from the plurality of time stamps and a corresponding time series of ranges between the UAV controller and the UAV based on the time series of propagation delays;
determining a time series of directional vectors between the UAV controller and the UAV from the communicating the link state data and/or communicating the UAV operational data over the established wireless link;
determining a time series of positions of the UAV relative to the UAV controller from the time series of ranges and the time series of directional vectors;
determining a velocity of the UAV relative to the UAV controller from the time series of positions; and
indicating the velocity of the UAV on a display of the UAV controller to a user of the UAV controller.

18. The system of claim 13, wherein the link state data comprises a time series of a plurality of power measurements corresponding to receptions of the link state data and/or the UAV operational data by the UAV controller or the UAV over the established wireless link, the method further comprising:
detecting a change in link gain of the established wireless link in the time series of power measurements; and
adjusting a modulation of the wireless link and/or increasing or decreasing a transmission data rate according to the detected change in link gain.

19. The system of claim 13, wherein the link state data comprises a time series of a plurality of power measurements corresponding to receptions of the link state data and/or the UAV operational data by the UAV controller or the UAV over the established wireless link, the method further comprising:

detecting a change in link gain of the established wireless link in the time series of power measurements indicating a transition in a link state of the established wireless link from a line-of-sight link state to a non-line-of-sight link state; and generating the UAV operational data to cause the UAV to perform flight operations to re-establish the line-of-sight link state.

20. The system of claim 13, the method further comprising:

determining a time series of directional vectors between the UAV controller and the UAV from the communicating the link state data and/or communicating the UAV operational data over the established wireless link;

detecting a change in the time series of directional vectors indicating a transition in a link state of the established wireless link between a line-of-sight link state and a non-line-of-sight link state; and notifying a user of the UAV controller of the transition in the link state.

21. The system of claim 13, wherein the logic device is mounted to the UAV, the method further comprising:

determining a directional vector between the UAV controller and the UAV from the communicating the link state data and/or communicating the UAV operational data over the established wireless link;

piloting the UAV to maintain or adjust an orientation of the UAV relative to the UAV controller using the directional vector as a reference.

22. The system of claim 13, the method further comprising:

determining, from the communicating the link state data and/or communicating the UAV operational data over the established wireless link, a first directional vector from the UAV controller to the UAV and a second directional vector from the UAV to the UAV controller;

detecting a transition in a link state of the established wireless link from a line-of-sight link state to a non-line-of-sight link state; and determining the non-line-of-sight link state is due to detrimental multipath propagation based, at least in part, on the first and second directional vectors.

23. The system of claim 13, the method further comprising:

determining, from the communicating the link state data and/or communicating the UAV operational data over the established wireless link, a first directional vector from the UAV controller to the UAV and a second directional vector from the UAV to the UAV controller;

detecting a transition in a link state of the established wireless link from a line-of-sight link state to a non-line-of-sight link state; and determining the non-line-of-sight link state is due to detrimental multipath propagation based, at least in part, on the first and second directional vectors.

24. The system of claim 13, the method further comprising:

receiving UAV controller data and the link state data from the UAV controller over the established wireless link; and generating the UAV operational data based on the link state data and the UAV controller data received over the established wireless link from the UAV controller.

25. The system of claim 13, the method further comprising:

transmitting the UAV operational data to the UAV over the established wireless link.

26. The system of claim 13, wherein the generating the UAV operational data comprises:

adjusting UAV operational data generated by the UAV controller or the UAV based, at least in part, on the link state data, before the controlling operation of the UAV using the UAV operational data.

27. A non-transitory machine-readable medium storing a plurality of machine-readable instructions which when executed by one or more processors of a unmanned aerial vehicle (UAV) system are adapted to cause the UAV system to perform a computer-implemented method comprising:

establishing a wireless link between a UAV controller and a UAV using at least one transmitter antenna array and/or at least one receiver antenna array;

communicating link state data corresponding to the established wireless link over the established wireless link;

generating UAV operational data based, at least in part, on the link state data, wherein the UAV operational data is configured to control operation of the UAV; and controlling operation of the UAV using the UAV operational data.

\* \* \* \* \*